US008297987B2

(12) United States Patent
Nguyen et al.

(10) Patent No.: US 8,297,987 B2
(45) **Date of Patent: *Oct. 30, 2012**

(54) EXTENDED USB PLUG, USB PCBA, AND USB FLASH DRIVE WITH DUAL-PERSONALITY FOR EMBEDDED APPLICATION WITH MOTHER BOARDS

(75) Inventors: David Nguyen, San Jose, CA (US); Nan Nan, San Jose, CA (US); Jim Chin-Nan Ni, San Jose, CA (US); Frank I-Kang Yu, Palo Alto, CA (US); Abraham C. Ma, Fremont, CA (US); Ming-Shiang Shen, Taipei (TW)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/211,100

(22) Filed: Aug. 16, 2011

(65) Prior Publication Data

US 2011/0300724 A1 Dec. 8, 2011

Related U.S. Application Data

(60) Division of application No. 11/874,767, filed on Oct. 18, 2007, now Pat. No. 8,021,166, which is a continuation-in-part of application No. 11/866,927, filed on Oct. 3, 2007, now Pat. No. 8,043,099, which is a continuation-in-part of application No. 11/864,696, filed on Sep. 28, 2007, now Pat. No. 8,073,985, which is a continuation-in-part of application No. 11/624,667, filed on Jan. 18, 2007, now abandoned, and a continuation-in-part of application No. 10/854,004, filed on May 25, 2004, now Pat. No. 7,836,236, which is a continuation-in-part of application No. 10/708,172, filed on Feb. 12, 2004, now Pat. No. 7,021,971, said application No. 11/874,767 is a continuation-in-part of application No. 11/864,671, filed on Sep. 28, 2007, now abandoned, which is a continuation-in-part of application No. 11/466,759, filed on Aug. 23, 2006, now Pat. No. 7,702,831, said application No. 11/874,767 is a continuation-in-part of application No. 11/845,747, filed on Aug. 27, 2007.

(51) Int. Cl.
*H05K 5/03* (2006.01)

(52) U.S. Cl. ..................................................... 439/76.1

(58) Field of Classification Search ................. 439/76.1, 439/660, 946; 361/736, 737, 752
See application file for complete search history.

(56) References Cited

U.S. PATENT DOCUMENTS 4,572,604 A 2/1986 Ammon et al.
4,903,402 A 2/1990 Norton et al.

(Continued)

*Primary Examiner* — Neil Abrams

(74) *Attorney, Agent, or Firm* — Blakely Sokoloff Taylor & Zafman LLP

(57) ABSTRACT

An extended universal serial bus (USB) storage device is described herein. According to one embodiment, an extended USB storage device includes a printed circuit board assembly (PCBA) having a flash memory device and a flash controller mounted thereon, and an extended USB connector plug coupled to the PCBA for providing a USB compatible interface between an external device and the flash memory device and the flash controller, wherein the extended USB connector plug includes a first end used to couple to the external device and a second end coupled to the flash memory device and the flash controller. The extended USB connector plug includes multiple communication interfaces. Other methods and apparatuses are also described.

6 Claims, 28 Drawing Sheets

1400
SIDE VIEW
1409
1410
1406
1401
1411
1410
1407
1409
1406
1411
TOP VIEW
1400
1401
1411
1408
1406
1410
BOTTOM VIEW
1401
1400

U.S. PATENT DOCUMENTS 4,924,076 A 5/1990 Kitamura
5,277,596 A 1/1994 Dixon
5,564,933 A 10/1996 Bouchan et al.
5,623,552 A 4/1997 Lane
5,907,856 A 5/1999 Estakhri et al.
5,959,541 A 9/1999 DiMaria et al.
6,000,006 A 12/1999 Bruce et al.
6,012,636 A 1/2000 Smith
6,069,920 A 5/2000 Schulz et al.
6,081,858 A 6/2000 Abudayyeh et al.
6,125,192 A 9/2000 Bjorn et al.
6,193,152 B1 2/2001 Fernando et al.
6,202,138 B1 3/2001 Estakhri et al.
6,230,233 B1 5/2001 Lofgren et al.
6,275,894 B1 8/2001 Kuo et al.
6,321,478 B1 11/2001 Klebes
6,334,793 B1 1/2002 Amoni et al.
6,547,130 B1 4/2003 Shen
6,636,929 B1 10/2003 Frantz et al.
6,671,808 B1 12/2003 Abbot et al.
6,718,407 B2 4/2004 Martwick
6,733,329 B2 5/2004 Yang
6,778,401 B1 8/2004 Yu et al.
6,854,984 B1 2/2005 Lee et al.
6,880,024 B2 4/2005 Chen et al.
6,994,568 B2 2/2006 Huang et al.
7,021,971 B2 4/2006 Chou et al.
7,035,114 B2 4/2006 Lee
7,044,802 B2 5/2006 Chiou et al.
7,090,541 B1 8/2006 Ho
7,097,472 B2 8/2006 Parker
7,103,684 B2 9/2006 Chen et al.
7,103,765 B2 9/2006 Chen
7,104,848 B1 9/2006 Chou et al.
7,125,287 B1 10/2006 Chou et al.
7,155,545 B1 12/2006 Wang
7,165,998 B2 1/2007 Lee et al.
7,182,646 B1 2/2007 Chou et al.
7,249,978 B1 7/2007 Ni
7,251,139 B2 7/2007 Bhattacharya et al.
7,257,714 B1 8/2007 Shen
7,259,967 B2 8/2007 Ni
7,264,992 B2 9/2007 Hsueh et al.
7,297,024 B2 11/2007 Ni et al.
7,359,208 B2 4/2008 Ni
7,361,059 B2 4/2008 Harkabi et al.
7,416,419 B2 8/2008 Collantes et al.
7,815,469 B1 * 10/2010 Nguyen et al. ........... 439/607.35
8,021,166 B1 * 9/2011 Nguyen et al. ............... 439/76.1
2001/0043174 A1 11/2001 Jacobsen et al.
2002/0166023 A1 11/2002 Nolan et al.
2003/0046510 A1 3/2003 North
2003/0163656 A1 8/2003 Ganton
2004/0148482 A1 7/2004 Grundy et al.
2004/0255054 A1 12/2004 Pua et al.
2005/0102444 A1 5/2005 Cruz
2005/0160213 A1 7/2005 Chen
2005/0181645 A1 8/2005 Ni et al.
2005/0193161 A1 9/2005 Lee et al.
2005/0246243 A1 11/2005 Adams et al.
2005/0268082 A1 12/2005 Poisner
2006/0026348 A1 2/2006 Wallace et al.
2006/0065743 A1 3/2006 Fruhauf
2006/0075174 A1 4/2006 Vuong
2006/0106962 A1 5/2006 Woodbridge et al.
2006/0161725 A1 7/2006 Lee et al.
2006/0206702 A1 9/2006 Fausak
2006/0242395 A1 10/2006 Fausak
2007/0079043 A1 4/2007 Yu et al.
2007/0094489 A1 4/2007 Ota et al.
2007/0113067 A1 5/2007 Oh et al.
2007/0113267 A1 5/2007 Iwanski et al.
2007/0130436 A1 6/2007 Shen

* cited by examiner

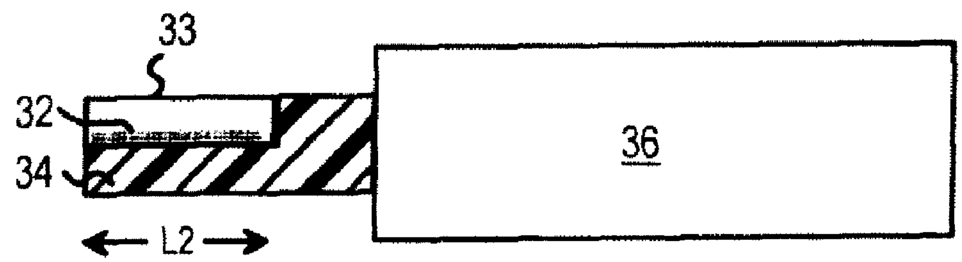
FIG. 3A PRIOR ART
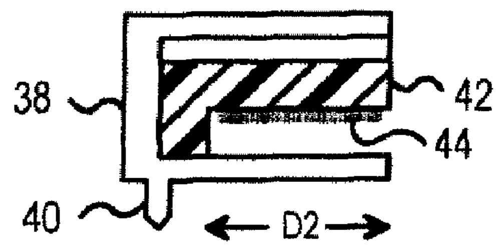
FIG. 3B PRIOR ART
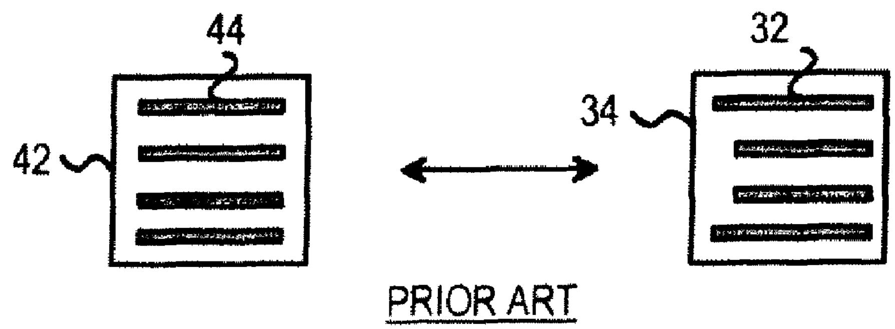
PRIOR ART
FIG. 3C
FIG. 3D

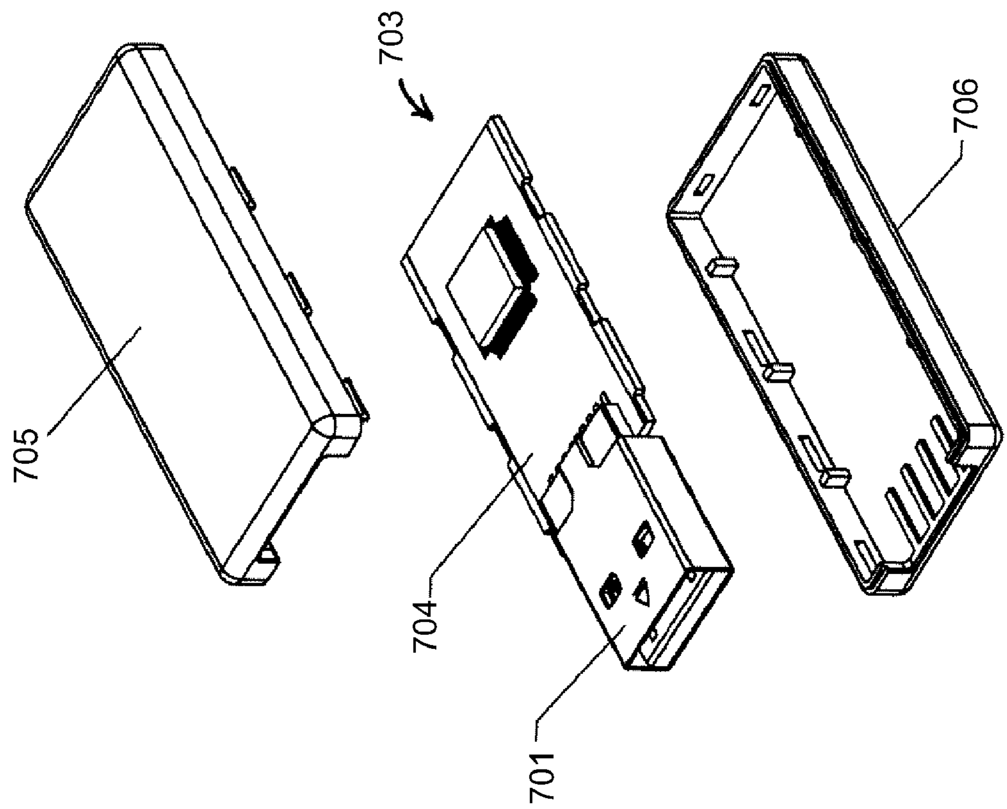
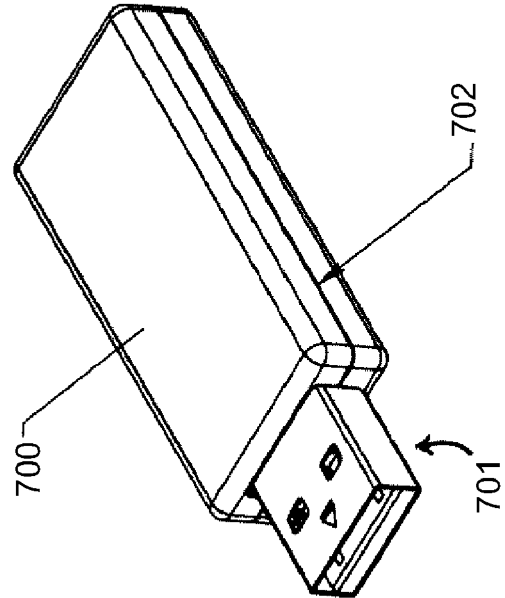
FIG. 7

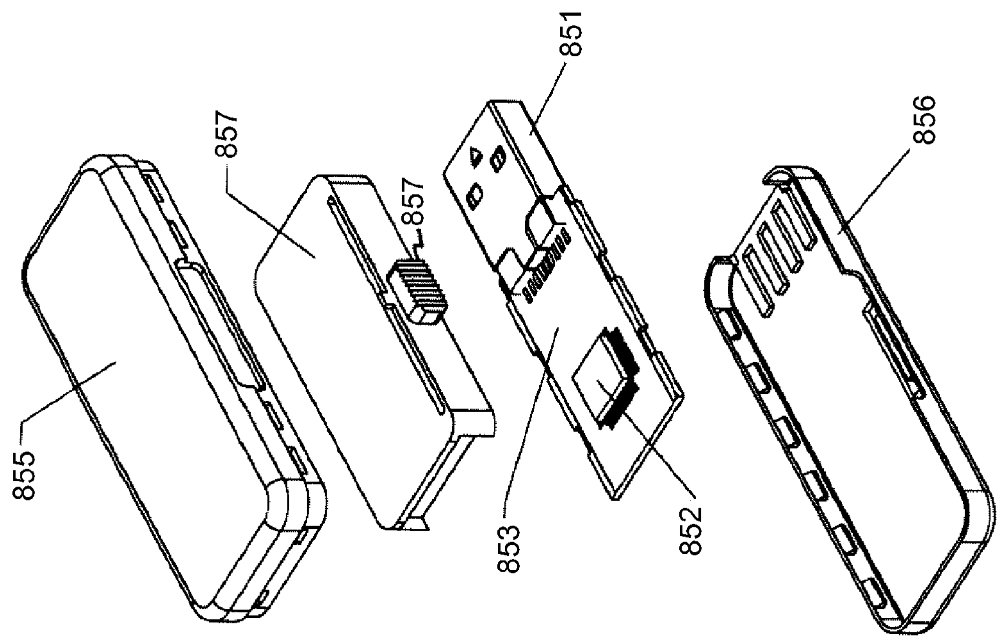
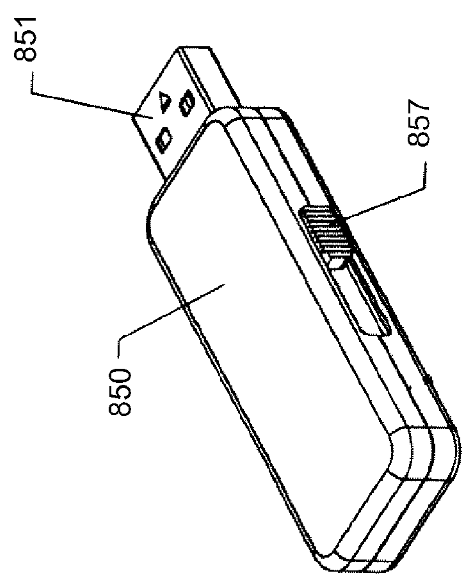
FIG. 8B

Table of Extended and Standard Pins in the Extended USB Connector and Socket

| SIDE | PIN-OUT | USB | MODIFIED PCIE 0 | SATA | MODIFIED PCIE 1 | MODIFIED PCIE 2 | MODIFIED PCIE 3 |
|---|---|---|---|---|---|---|---|
| A | 1 | 5V | 5V | 5V | 5V | 5V | 5V |
| A | 2 | D- | D- | D- | D- | D- | D- |
| A | 3 | D+ | D+ | D+ | D+ | D+ | D+ |
| A | 4 | GND | GND | GND | GND | GND | GND |
| B | 1 | | 3.3V | 3.3V | PETn | PETn | PETn |
| B | 2 | | 1.5V | N/C | PETp | PETp | PETp |
| B | 3 | | PETn | T- | GND | GND | GND |
| B | 4 | | PETp | T+ | PERn | PERn | PERn |
| B | 5 | | GND | GND | PERp | PERp | PERp |
| B | 6 | | PERn | R- | | PETn 1 | PETn 1 |
| B | 7 | | PERp | R+ | | PETp 1 | PETp 1 |
| B | 8 | | N/C | 12V | | GND | GND |
| B | 9 | | | | | PERn 1 | PERn 1 |
| B | 10 | | | | | PERp 1 | PERp 1 |
| B | 11 | | | | | | PETn 2 |
| B | 12 | | | | | | PETp 2 |
| B | 13 | | | | | | GND |
| B | 14 | | | | | | PERn 2 |
| B | 15 | | | | | | PERp 2 |
| B | 16 | | | | | | PETn 3 |
| B | 17 | | | | | | PETp 3 |
| B | 18 | | | | | | GND |
| B | 19 | | | | | | PERn 3 |
| B | 20 | | | | | | PERp 3 |

FIG. 13

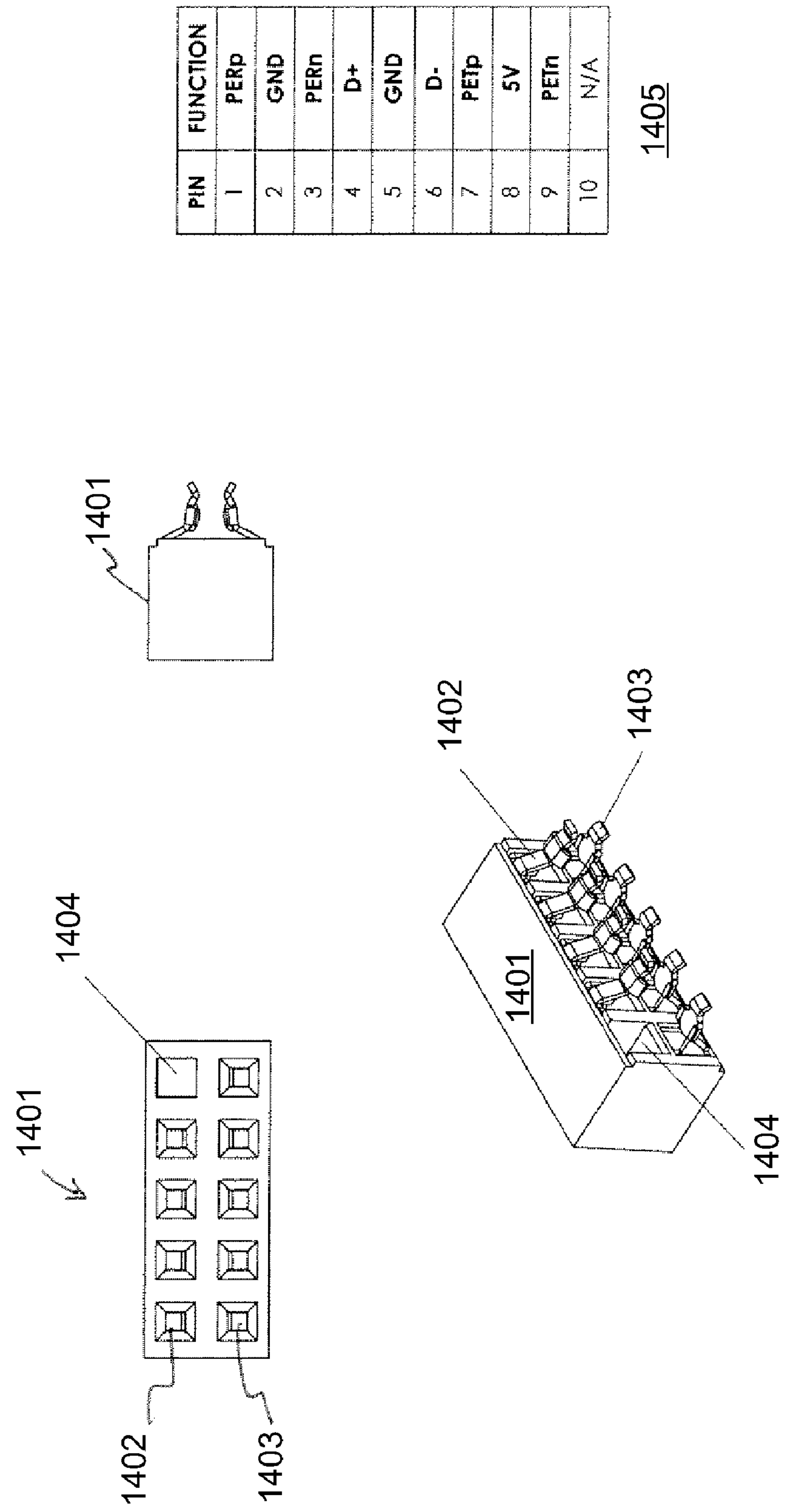
| PIN | FUNCTION |
|---|---|
| 1 | PERp |
| 2 | GND |
| 3 | PERn |
| 4 | D+ |
| 5 | GND |
| 6 | D- |
| 7 | PETp |
| 8 | 5V |
| 9 | PETn |
| 10 | N/A |

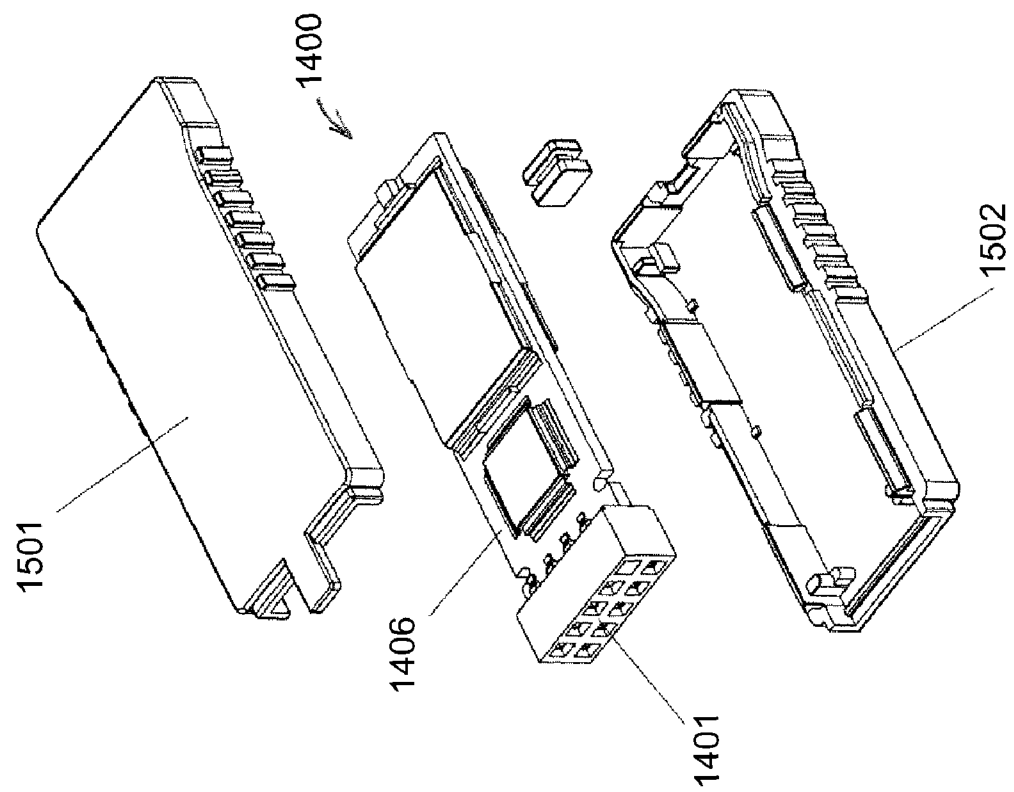
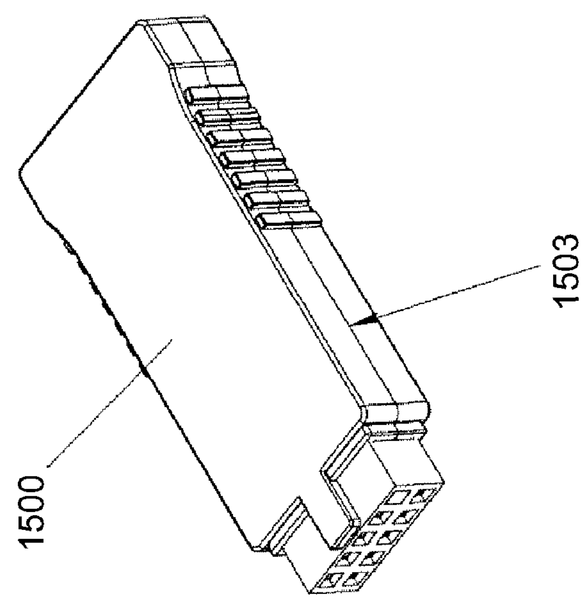
FIG. 15A

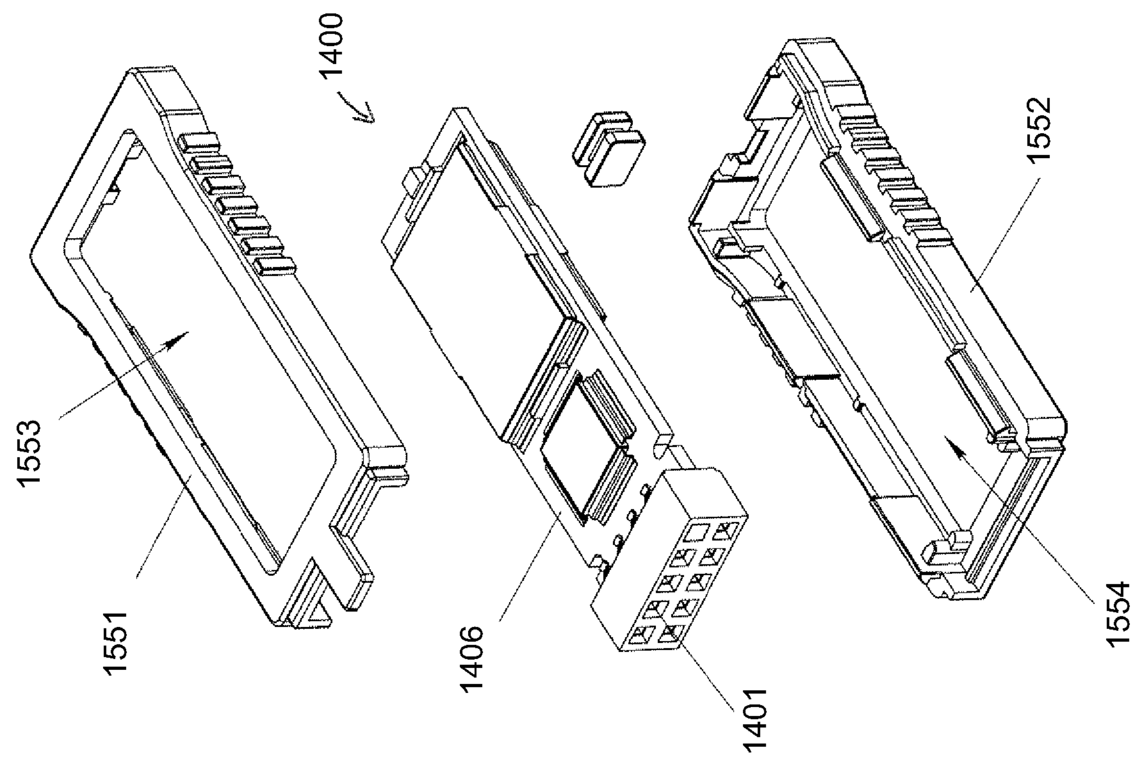
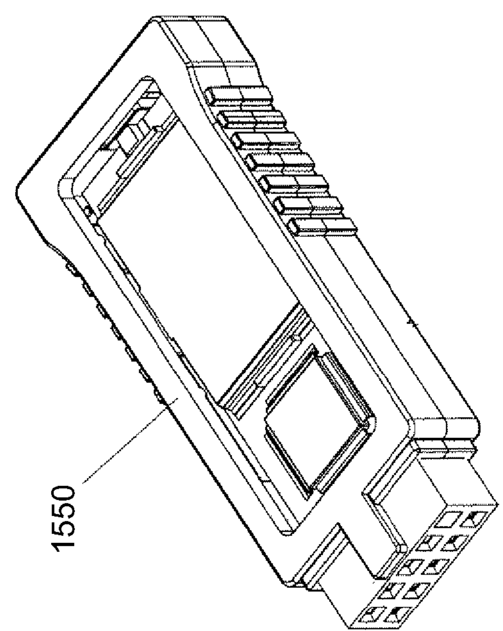
FIG. 15C

| PIN | FUNCTION |
|---|---|
| 1 | PERp |
| 2 | GND |
| 3 | PERn |
| 4 | D+ |
| 5 | GND |
| 6 | D- |
| 7 | PETp |
| 8 | 5V |
| 9 | PETn |
| 10 | N/A |

EXTENDED USB PLUG, USB PCBA, AND USB FLASH DRIVE WITH DUAL-PERSONALITY FOR EMBEDDED APPLICATION WITH MOTHER BOARDS

RELATED APPLICATIONS

This application is a divisional of U.S. patent application Ser. No. 11/874,767, filed Oct. 18, 2007, entitled "Extended USB Plug, USB, PCBA, and USB Flash Drive with Dual-Personality For Embedded Application With Mother Boards", now U.S. Pat. No. 8,021,166, which is a CIP of U.S. patent application Ser. No. 11/866,927, filed Oct. 3, 2007, entitled "Extended USB Plug, USB PCBA and USB Flash Drive with Dual-Personality", now U.S. Pat. No. 8,043,099, which is a CIP of U.S. patent application Ser. No. 11/864,696, entitled "Backward Compatible Extended USB Plug And Receptacle With Dual Personality", filed Sep. 28, 2007, now U.S. Pat. No. 8,073,985, which is a CIP of U.S. Patent application for "Electronic Data Storage Medium with Fingerprint Verification Capability," U.S. App. Ser. No. 11/624,667, filed Jan, 18, 2007, and a continuation-in-part of U.S. Patent application for "Extended Secure-Digital Card Devices and Hosts," U.S. patent application Ser. No. 10/854,004, filed May 25, 2004, now U.S. Pat. No. 7,836,236, which is a continuation-in-part of U.S. patent application Ser. No. 10/708,172, filed Feb. 12, 2004, now U.S Pat. No. 7,021,971.

The above cited co-pending U.S. patent application Ser. No. 11/874,767 is also a CIP of U.S. patent application Ser. No. 11/864,671, filed Sep. 28, 2007, now abandoned, which is a CIP of U.S. patent application Ser. No. 11/466,759, filed Aug. 23, 2006, now U.S. Pat. No. 7,702,831, entitled "Flash Memory Controller for Electronic Data Flash Card. U.S. patent application Ser. No. 11/874,767 is also a CIP of co-pending U.S. patent application Ser. No. 11/845,747, filed Aug. 27, 2007. This application is also related to U.S. Patent Nos. 7,108, 560, 7,104,848, and 7,125,287.

The disclosure of the above-identified applications and patents is incorporated by reference herein in its entirety.

FIELD OF THE INVENTION

The present invention relates generally to extended universal serial bus (USB) connectors. More particularly, this invention relates to USB connectors having multiple interfaces.

BACKGROUND

Universal-Serial-Bus (USB) has been widely deployed as a standard bus for connecting peripherals such as digital cameras and music players to personal computers (PCs) and other devices. Currently, the top transfer rate of USB is 480 Mb/s, which is quite sufficient for most applications. Faster serial-bus interfaces are being introduced to address different requirements. PCI Express, at 2.5 Gb/s, and SATA, at 1.5 Gb/s and 3.0 Gb/s, are two examples of high-speed serial bus interfaces for the next generation devices, as are IEEE 1394 and Serial Attached Small-Computer System Interface (SCSI).

FIG. 1A shows a prior-art peripheral-side USB connector. USB connector 10 may be mounted on a board in the peripheral. USB connector 10 can be mounted in an opening in a plastic case (not shown) for the peripheral. USB connector 10 contains a small connector substrate 14, which is often white ceramic, black rigid plastic, or another sturdy substrate. Connector substrate 14 has four or more metal contacts 16 formed thereon. Metal contacts 16 carry the USB signals generated or received by a controller chip in the peripheral. USB signals include power, ground, and serial differential data D+, D−. USB connector 10 contains a metal case that wraps around connector substrate 14. The metal case touches connector substrate 14 on three of the sides of connector substrate 14. The top side of connector substrate 14, holding metal contacts 16, has a large gap to the top of the metal case. On the top and bottom of this metal wrap are formed holes 12. USB connector 10 is a male connector, such as a type-A USB connector.

FIG. 1B shows a female USB connector. Female USB connector 20 can be an integral part of a host or PC, or can be connected by a cable. Another connector substrate 22 contains four metal contacts 24 that make electrical contact with the four metal contacts 16 of the male USB connector 10 of FIG. 1A. Connector substrate 22 is wrapped by a metal case, but small gaps are between the metal case and connector substrate 22 on the lower three sides. Locking is provided by metal springs 18 in the top and bottom of the metal case. When male USB connector 10 of FIG. 1A is flipped over and inserted into Female USB connector 20 of FIG. 1B, metal springs 18 lock into holes 12 of male USB connector 10. This allows the metal casings to be connected together and grounded. Universal-Serial-Bus (USB) is a widely used serial-interface standard for connecting external devices to a host such as a personal computer (PC). Another new standard is PCI Express, which is an extension of Peripheral Component Interconnect (PCI) bus widely used inside a PC for connecting plug-in expansion cards. An intent of PCI Express is to preserve and re-use PCI software. Unfortunately, USB connectors with their 4 metal contacts do not support the more complex PCI Express standard.

FIGS. 2A-2B show an ExpressCard and its connector. A new removable-card form-factor known as ExpressCard has been developed by the Personal-Computer Memory Card International Association (PCMCIA), PCI, and USB standards groups. ExpressCard 26 is about 75 mm long, 34 mm wide, and 5 mm thick and has ExpressCard connector 28.

FIG. 2B shows that ExpressCard connector 28 fits into connector or socket 30 on a host when ExpressCard 26 is inserted into an ExpressCard slot on the host. Since ExpressCard connector 28 and socket 30 are 26-pin connectors, they contain many more signals than a 4-pin USB connector. The additional PCI-Express interface can be supported as well as USB. ExpressCard 26 can also use USB to communicate with the host. Differential USB data signals USBD+ and USBD− are connected between ExpressCard 26 and a host chip set. The host chip set contains a USB host controller to facilitate communication with ExpressCard 26.

PCI Express supports data rates up to 2.5 G/b, much higher than USB. While the ExpressCard standard is useful for its higher possible data rate, the 26-pin connectors and wider card-like form factor limit the use of ExpressCards. The smaller USB connector and socket are more desirable than the larger ExpressCard. Another interface, serial AT-attachment (SATA) supports data rates of 1.5 Gb/s and 3.0 Gb/s. However, SATA uses two connectors, one 7-pin connector for signals and another 15-pin connector for power. Due to its clumsiness, SATA is more useful for internal storage expansion than for external peripherals. While SATA and ExpressCard are much higher-speed interfaces than USB, they use larger, bulky connectors while USB has a single, small connector.

FIGS. 3A-3D shows cross-sections of a prior-art USB connector and socket. In FIG. 3A, a prior-art peripheral-side plug or USB connector has plastic housing 36 that the user can grip when inserting the USB connector into a USB socket such as the socket in FIG. 3B. Pin substrate 34 can be made of ceramic, plastic, or other insulating material, and supports metal contact pins 32. There are 4 metal contact pins 32 arranged as shown in the top view of pin substrate 34 in FIG. 3D. Metal cover 33 is an open-ended rectangular tube that wraps around pin substrate 34 and the gap above metal contact pins 32. In FIG. 3B, a prior-art host-side USB socket is shown, such as a USB socket on a host PC. Metal cover 38 is rectangular tube that surrounds pin substrate 42 and has an opening to receive the USB connector's pin substrate 34. Metal contact pins 44 are mounted on the underside of pin substrate 42. Mounting pin 40 is formed from metal cover 38 and is useful for mounting the USB socket to a printed-circuit board (PCB) or chassis on the host PC.

Metal contact pins 44 are arranged as shown in the bottom view of pin substrate 42 of FIG. 3C. The four metal contact pins 44 are arranged to slide along and make contact with the four metal contact pins 32 when the USB connector is inserted into the USB socket. Pin substrates 34, 42 are formed in an L-shape with matching cutouts above metal contact pins 32 and below metal contact pins 44 that fit together when inserted. Metal contact pins 32, 44 can have a slight bend or kink in them (not shown) to improve mechanical and electrical contact. The bend produces a spring-like action that is compressed when the USB connector is inserted into the USB socket. The force of the compressed spring improves contact between metal contact pins 32, 44. While useful, prior-art USB sockets and connectors have only four metal contact pins 32 that mate with four metal contact pins 44. The four metal contact pins carry power, ground, and differential data lines D+, D−. There are no additional pins for extended signals required by other standard buses, such as PCI Express or Serial ATA.

SUMMARY OF THE DESCRIPTION

An extended universal serial bus (USB) storage device is described herein. According to one embodiment, a USB storage device includes a printed circuit board assembly (PCBA) having a flash memory device and a flash controller mounted thereon, and an extended USB connector plug coupled to the PCBA for providing a USB compatible interface between an external device and the flash memory device and the flash controller, wherein the extended USB connector plug includes a first end used to couple to the external device and a second end coupled to the flash memory device and the flash controller. The first end of the extended USB connector plug includes an extended pin substrate that has an extended length that is longer than or equal to a standard length of the pin substrate of the standard USB connector plug, a plurality of plug standard metal contact pins disposed on the pin substrate, wherein when the standard pin substrate of the extended USB connector plug is inserted into a cavity of the standard USB socket, the standard metal contact pins make physical and electrical contact with plug standard metal contact pins on a plug pin substrate, and a plurality of plug extended metal contact pins on the extended pin substrate, wherein when the extended pin substrate of the extended USB connector plug is inserted into a cavity of the extended USB socket, the plug extended metal contact pins on the extended pin substrate make physical and electrical contact with socket extended metal contact pins on the extended USB socket. The second end of the extended USB connector plug includes a plurality of electrical contact pins to electrically coupling the flash memory device and the flash controller. Other methods and apparatuses are also described.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 3A-3D show cross-sections of a prior-art USB connector and socket.

FIG. 7 is a block diagram illustrating an extended USB device according to one embodiment of the invention.

FIGS. 8A-8B are block diagrams illustrating an extended USB device according to certain embodiments of the invention.

FIG. 13 is a table of extended and standard pins in the extended USB connector and socket according to one embodiment of the invention.

FIGS. 14A-14C are block diagrams illustrating certain configurations of an extended USB device according to certain embodiments of the invention.

FIGS. 15A-15C are block diagrams illustrating certain configurations of an extended USB drive according to certain embodiments of the invention.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, a USB storage device such as a USB flash device includes a dual personality extended USB plug which includes a metal case, and a connector substrate in multiple different form factors that can be coupled to a PCBA (printed circuit board assembly) having a flash memory such as multi-level cell (MLC) flash memory and a flash controller IC (integrated circuit) or a MLC chip-on-board (COB) design.

Figure 1A:
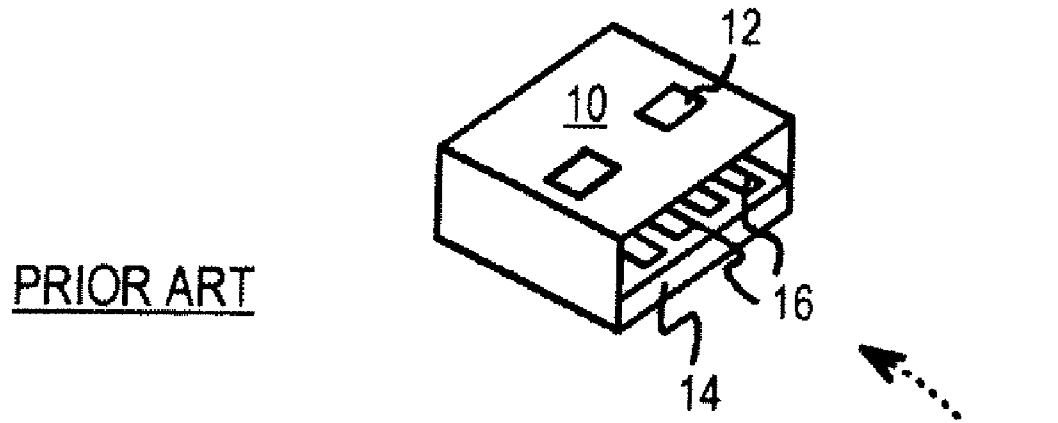
FIGS. 1A-1B show a conventional USB connector.
Figure 1B:
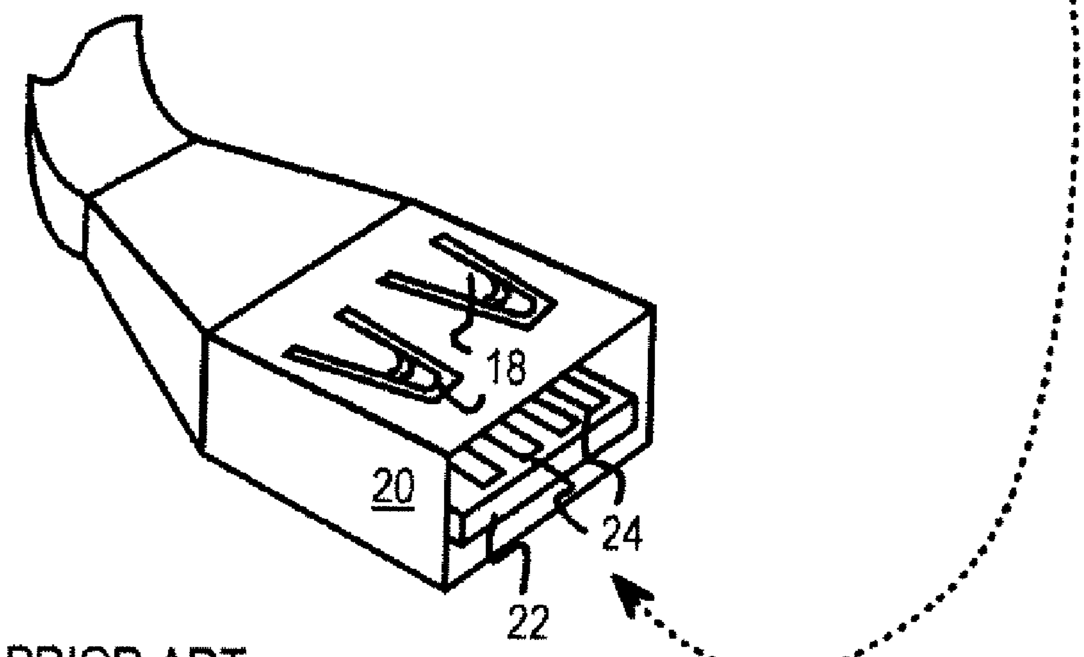
Figure 2A:
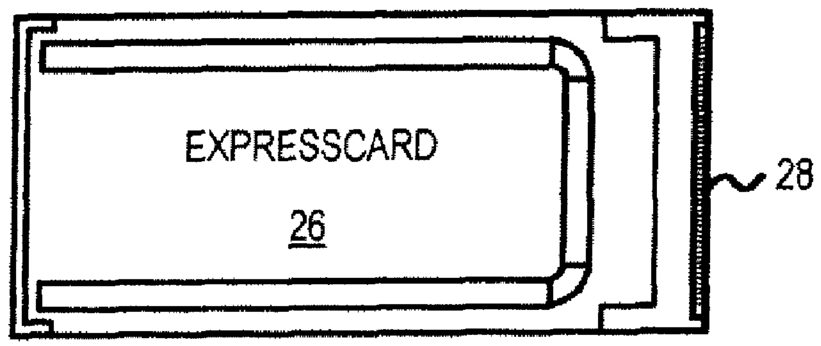
FIGS. 2A-2B show an ExpressCard and its connector.
Figure 2B:
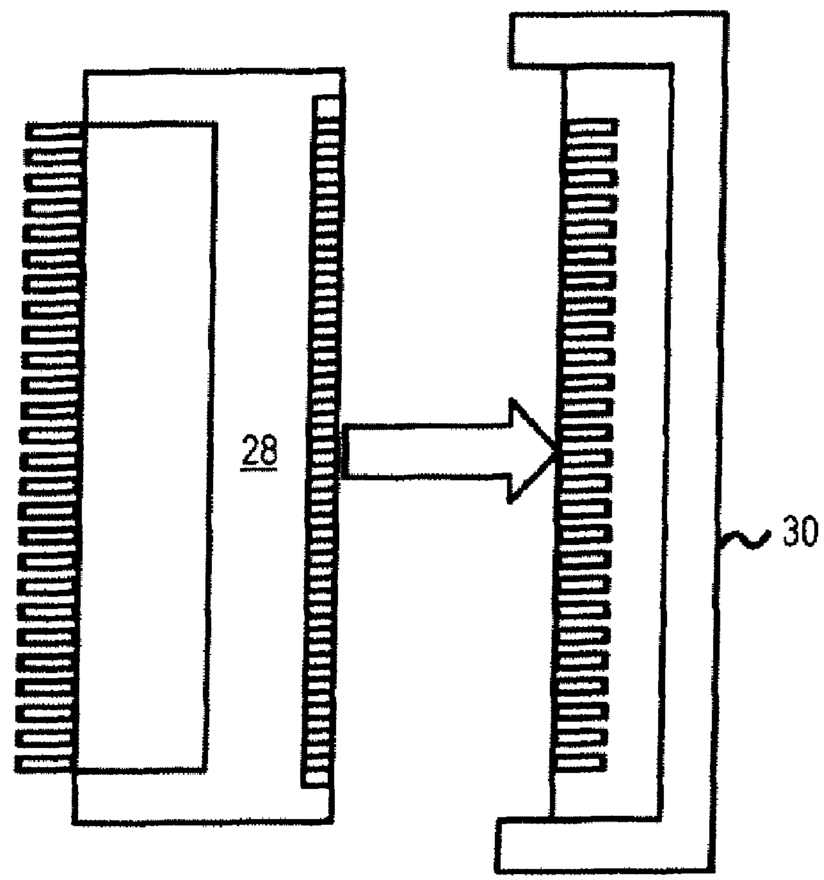
Figure 4A:
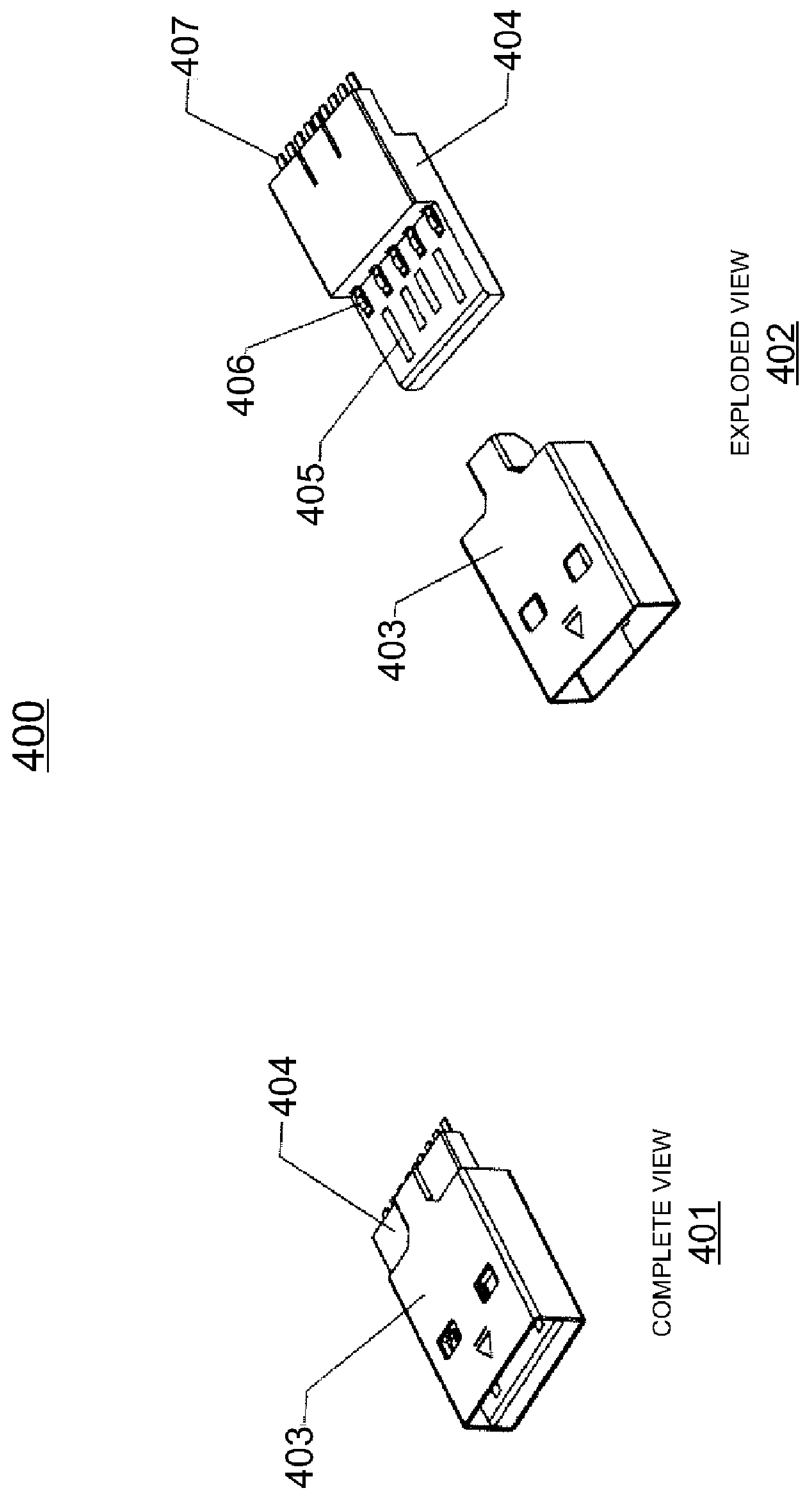
FIGS. 4A-4C are block diagrams illustrating an extended USB device configuration according to one embodiment of the invention.
Figure 4B:
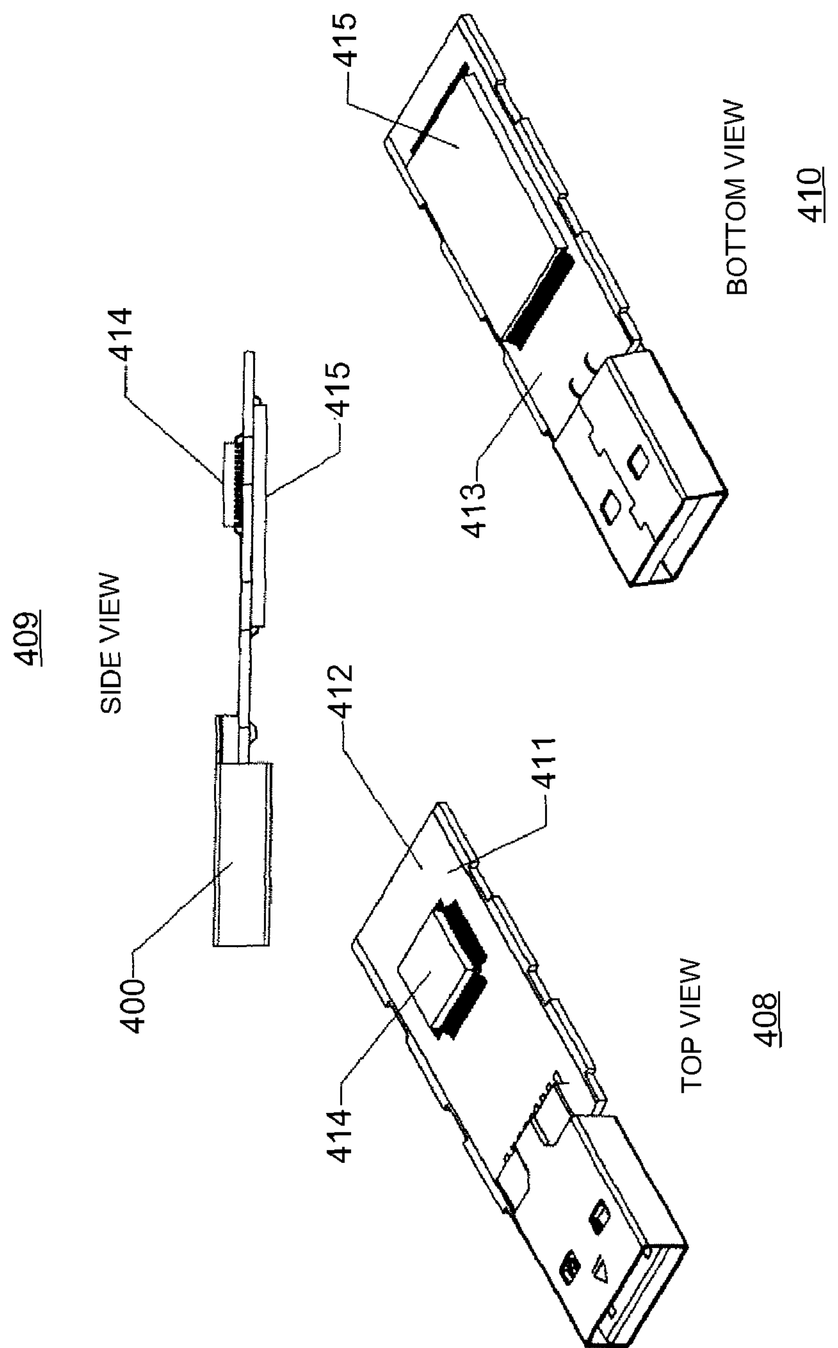

FIGS. 4A-4B are diagrams illustrating perspective views of a USB extended plug having multiple personalities according to one embodiment of the invention. Referring to FIG. 4A, a USB extended plug is showed in a complete view 401 and an exploded view 402. In one embodiment, USB extended plug 400 includes a casing or housing 403 and a USB connector substrate 404, where the connector substrate 404 can be plugged into the casing 403. Casing 403 may be made of metal, also referred to as a metal case herein. Connector substrate 404 includes a first end having multiple electrical contact fingers or tabs 405 and a second end having multiple electrical contact pins 407. In a particular embodiment, pins 407 include 9 or more pins. Connector substrate 404 further includes one or more springs or metal contacts 406 which may be used to provide pressure to another USB connector to have physical contact with contact fingers 405 when the other USB connector is inserted into an opening of the extended USB plug.

In one embodiment, contact fingers 405 may be disposed on a top surface of connector substrate 404 and additional contact fingers (not shown) may be disposed on a bottom surface of connector substrate 404. For example, contact fingers 405 may be compatible with standard USB specification while the additional contact fingers may be designed compatible with other interfaces such as PCI Express or IEEE 1349 specifications. As a result, extended USB plug 400 may be used for multiple different communication interfaces, also referred to as dual personalities. Further detailed information regarding the extended USB plug having dual personalities can be found in certain above-referenced applications and/or patents, such as, for example, U.S. Pat. No. 7,021,971 and U.S. patent application Ser. No. 11/864,696, which have been incorporated by reference.

Referring now to FIG. 4B, where extended USB plug 400 may be attached to a PCBA having a memory device and a memory controller for controlling the memory device. As shown in FIG. 4B as top view 408, side view 409, and bottom view 410, extended USB plug 400 may be attached to PCB substrate 411, for example, by soldering pins 407 on the PCB substrate 411. In addition, a memory device such as flash memory device may be disposed on a surface of the PCB substrate 411 and a memory controller such as a flash controller may be disposed on the other surface of the PCB substrate 411. In this example, memory device 415 is disposed on a bottom surface 413 of PCB substrate 411 and memory controller 414 is disposed on a top surface 412 of PCB substrate 411. In one embodiment, memory device 415 may be an MLC compatible memory IC and controller 414 may be an MLC compatible memory controller IC.

Figure 4C:
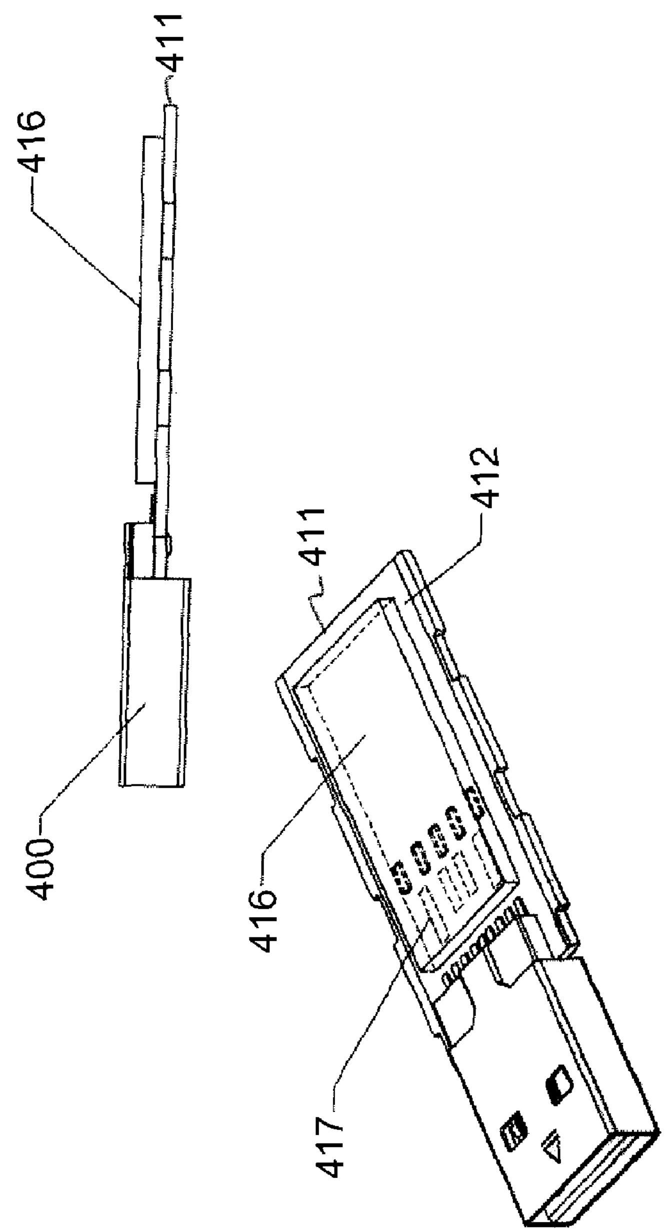

According to a further embodiment, techniques as described with respect to FIGS. 4A-4B may also be applied to a configuration where a flash memory and a flash controller are integrated into a single package such as a chip on board (COB) package as shown in FIG. 4C. Referring to FIG. 4C, a COB package 416, which may an MLC package, may be disposed on a surface such as a top surface 412 of PCB substrate 411, where the COB package 416 may be attached (e.g., soldered) via one or more contact fingers 417 disposed on a surface of COB 416. COB 416 may be any of the COB packages such as, for example, as those shown in FIGS. 6A-6B.

Figure 5A:
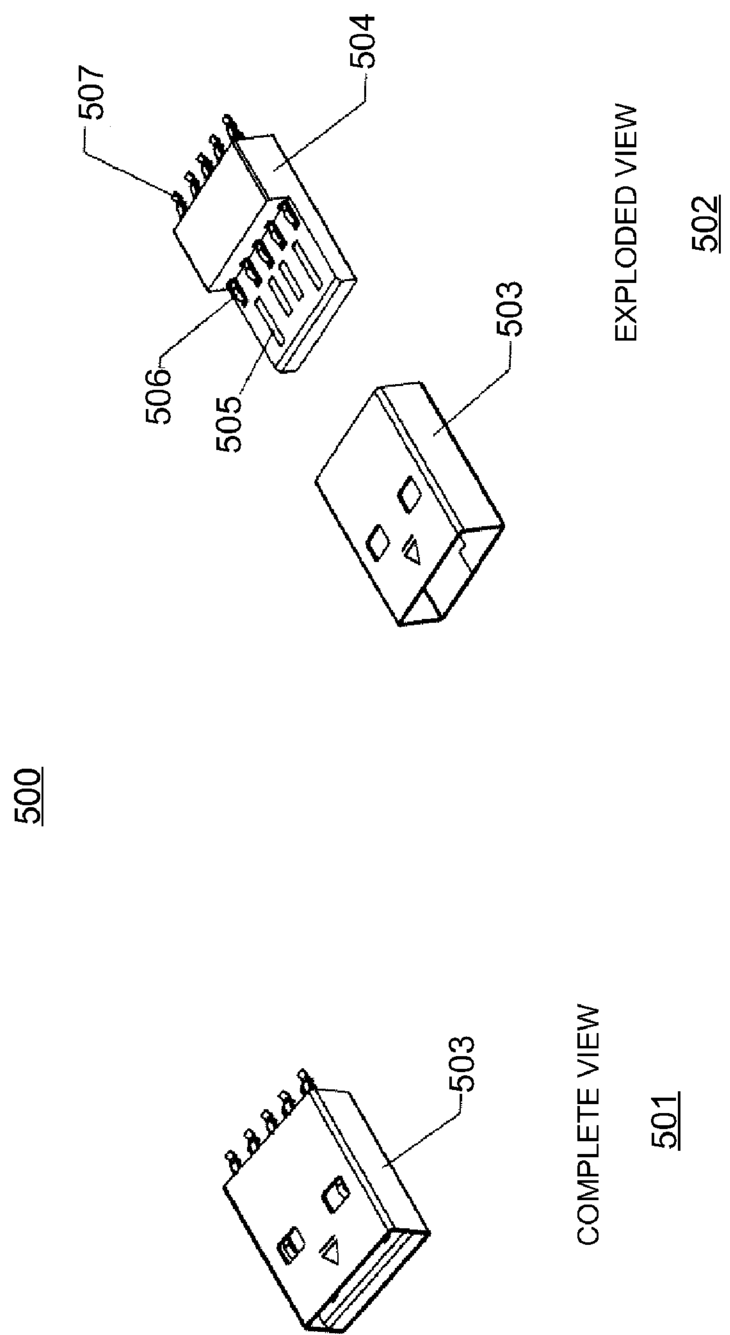
FIGS. 5A-5C are block diagrams illustrating an extended USB device configuration according to one embodiment of the invention.
Figure 5B:
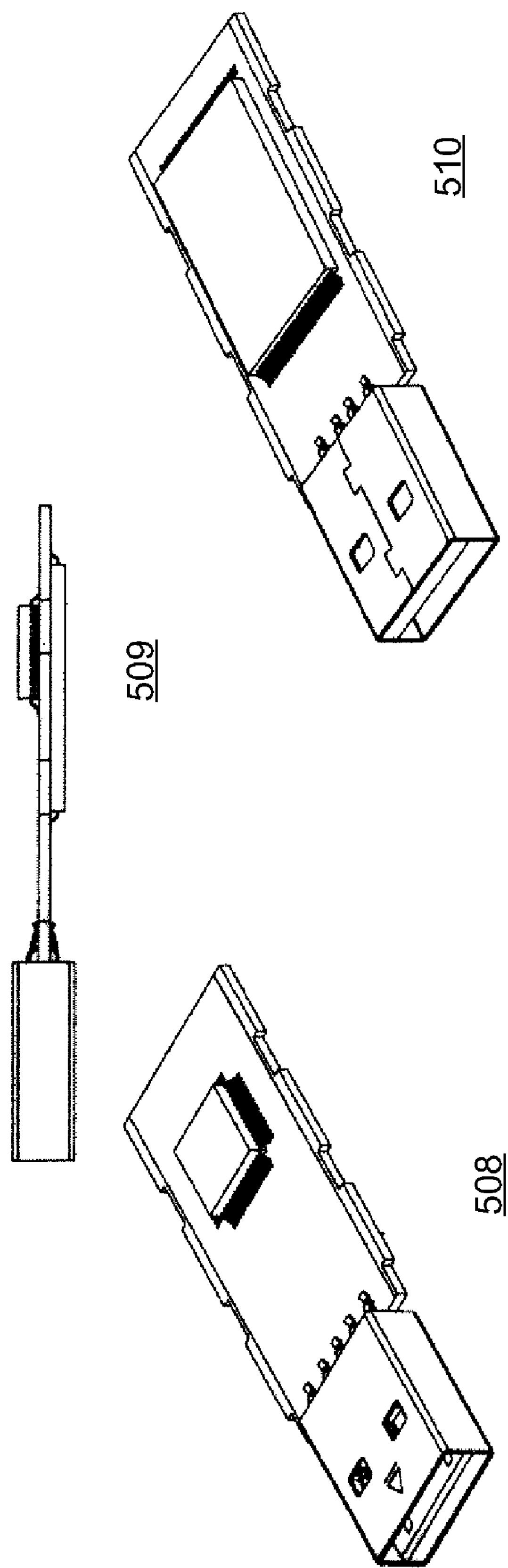

FIGS. 5A and 5B are diagrams illustrating perspective views of a USB extended plug having multiple personalities according to another embodiment of the invention. Referring to FIG. 5A, a USB extended plug is showed in a complete view 501 and an exploded view 502. In one embodiment, similar to extended USB plug 400 of FIGS. 4A-4B, extended USB plug 500 includes a casing or housing 503 and a USB connector substrate 504, where the connector substrate 504 can be plugged into the casing 503. Casing 503 may be made of metal, also referred to as a metal case herein. Connector substrate 504 includes a first end having multiple electrical contact fingers or tabs 505 and a second end having multiple electrical contact pins 507. In one embodiment, pins 507 include multiple rows of pins, each having multiple pins. In a particular embodiment, pins 507 include a first row and a second row, where the first row includes 5 pins and the second row includes 4 or more pins. Connector substrate 504 further includes one or more springs or metal contacts 506 which may be used to provide pressure to another USB connector to have physical contact with contact fingers 505 when the other USB connector is inserted into an opening of the extended USB plug.

In one embodiment, similar to extended USB plug 400, contact fingers 505 may be disposed on a top surface of connector substrate 504 and additional contact fingers (not shown) may be disposed on a bottom surface of connector substrate 504. For example, contact fingers 505 may be compatible with standard USB specification while the additional contact fingers may be designed compatible with other interfaces such as PCI Express or IEEE 1349 specifications. As a result, extended USB plug 500 may be used for multiple different communication interfaces, also referred to as dual personalities.

Referring now to FIG. 5B, where extended USB plug 500 may be attached to a PCBA having a memory device and a memory controller for controlling the memory device. As shown in FIG. 5B as top view 508, side view 509, and bottom view 510, extended USB plug 500 may be attached to PCB substrate, for example, by soldering pins 507 on the PCB substrate. In this example as shown in side view 509, the first row of pins 507 may be soldered on a top surface of the PCB substrate while the second row of pins 507 may be soldered on a bottom surface of the substrate, or vice versa. In addition, a memory device such as flash memory device may be disposed on a surface of the PCB substrate and a memory controller such as a flash controller may be disposed on the other surface of the PCB substrate. In this example, similar to the configuration as shown in FIGS. 4A-4B, a memory device is disposed on a bottom surface of PCB substrate and a memory controller is disposed on a top surface of PCB substrate. Further, the memory device may be an MLC compatible memory IC and the controller may be an MLC compatible memory controller IC.

Figure 5C:
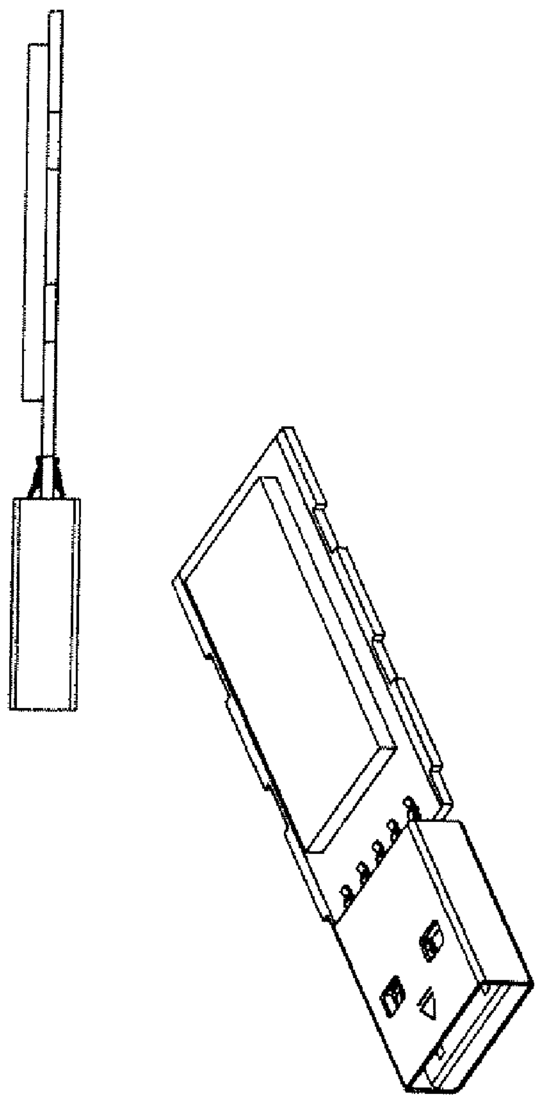
Figure 6A:
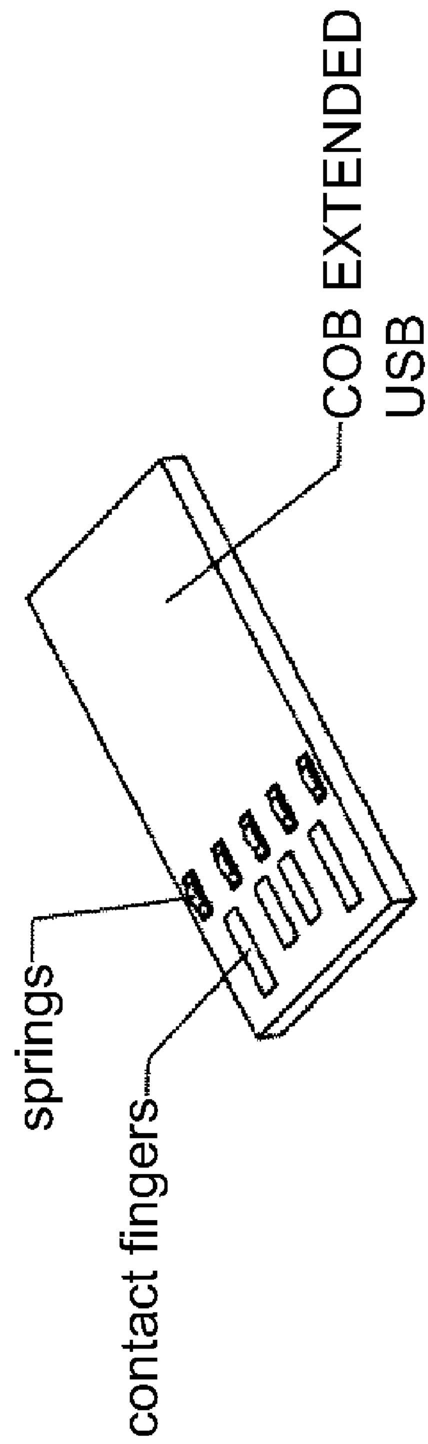
FIGS. 6A-6B are block diagrams illustrating certain form factors of a chip-on-board (COB) package according to one embodiment of the invention.
Figure 6B:
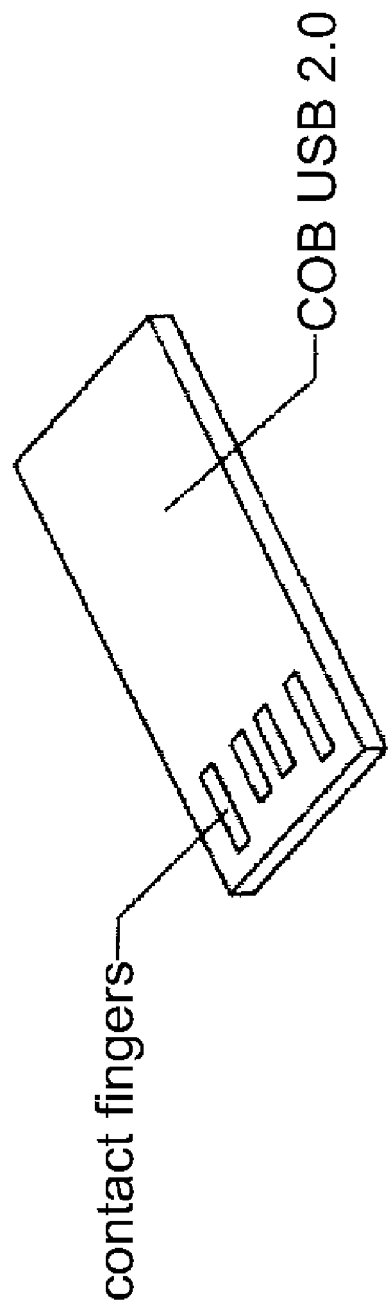

Similarly, according to a further embodiment, techniques as described with respect to FIGS. 5A-5B may also be applied to a configuration where a flash memory and a flash controller are integrated into a single package such as a chip on board (COB) package as shown in FIG. 5C, where a COB package may be any of the COB packages such as, for example, as those shown in FIGS. 6A-6B. Other configurations may also exist.

Figure 14B:
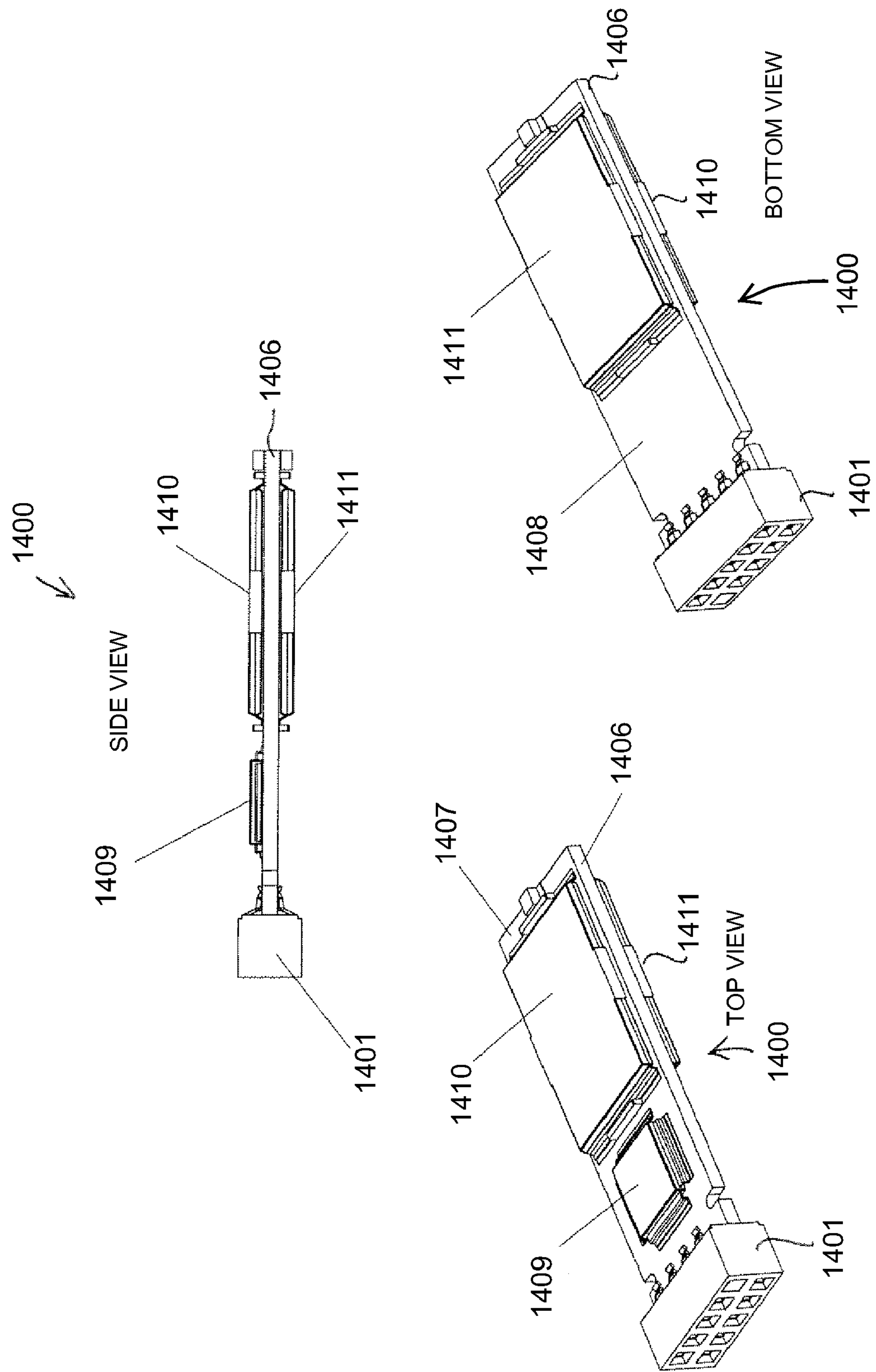
Figure 14C:
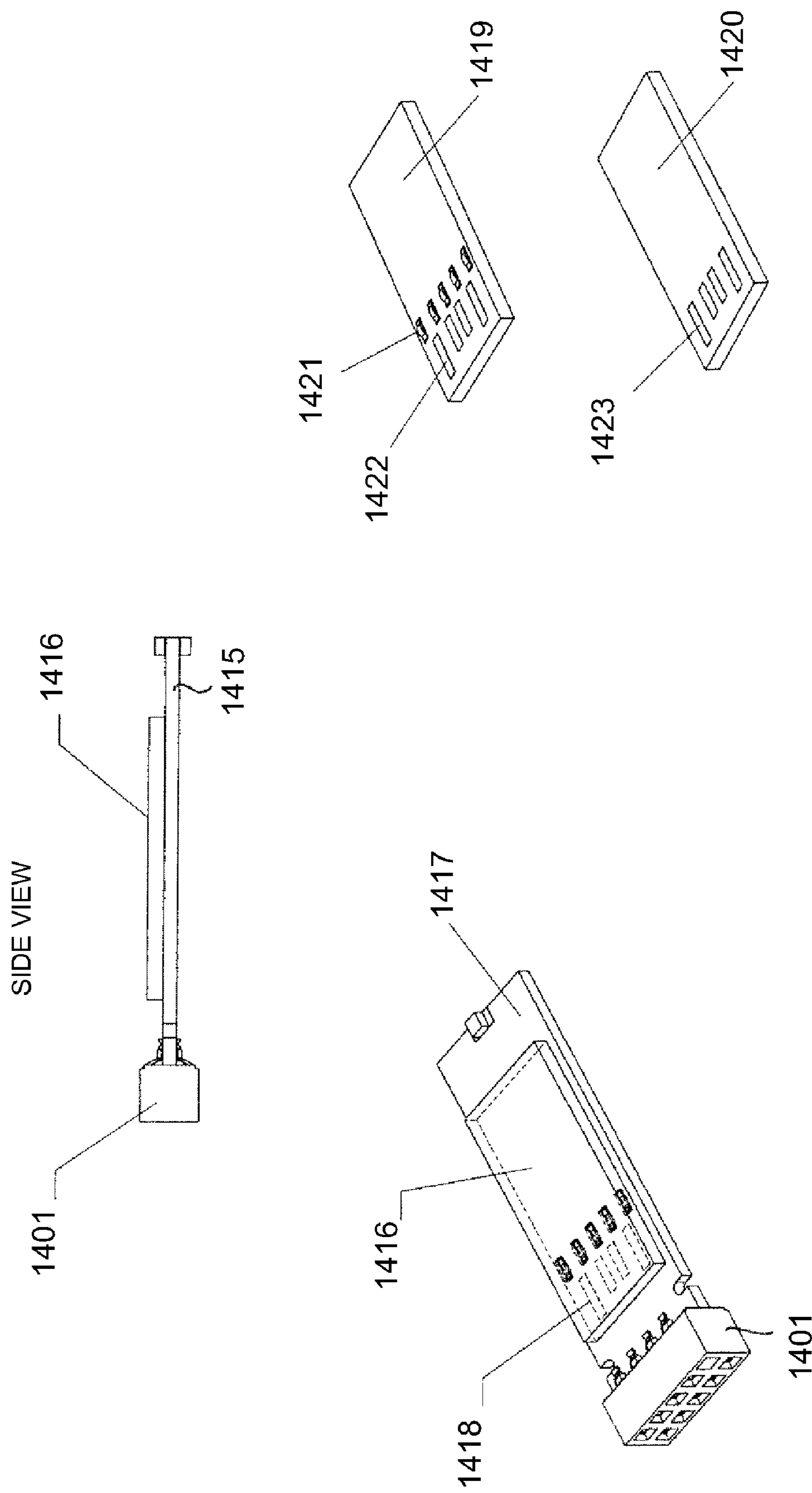

According to certain embodiments of the inventions, certain form factors as described above with respect to FIGS. 4-6 can also be utilized in an embedded configuration, for example, embedded within an ordinary computer chassis as a USB component. FIGS. 14A-14C are block diagrams illustrating certain configurations of an extended USB device according to certain embodiments of the invention.

Referring to FIG. 14A, an embedded USB flash drive or Ready Boost drive is to use with a MLC dual-personality extended USB header vertical receptacle 1401. The USB header vertical receptacle 1401 may include a 9-pin socket that is compatible with an ordinary socket or connector used in an ordinary computer. In this example as shown in FIG. 14A, USB header vertical receptacle 1401 includes two rows of pins 1402-1403, each having five pins. One of the rows 1402-1403, in this example, row 1402 only includes 4 pins, leaving one of the plugs 1404 unattached. As a result, a total of 9 pins are implemented in this example, where functionality of each pin is shown in table 1405. Note that the USB header vertical receptacle 1401 is shown for illustration purposes only; other forms of receptacles may also be implemented.

According to one embodiment, as shown in FIG. 14B, each of the rows 1402-1403 may be mounted or soldered on corresponding electrical contact pads of a surface of a PCBA, for example, one for each of top and bottom surfaces of the PCBA, where a PCBA may be any of the above configurations. For example, referring to FIG. 14B, USB header vertical receptacle 1401 is mounted onto a PCBA 1400 having a MLC controller 1409 and one or more MLC memory ICs 1410-1411, which may be mounted (e.g., surface mounted) on a top surface 1407 and a bottom surface 1408 of PCB 1406. As described above, the USB header vertical receptacle 1401 include two rows of pins, each being mounted on a surface (e.g., top or bottom surfaces) of PCB 1406. As a result, the orientation of plugs of USB header vertical receptacle 1401 is in a direction parallel with the top and bottom surfaces 1407-1408 of PCBA 1400, which would enable the finished USB package to be mounted on (e.g., via a corresponding connector, in this example, a male connector of) a chassis such as a motherboard of a computer in a vertical orientation with respect to a surface of the motherboard.

Alternatively, as shown in FIG. 14C, the PCBA may be implemented as a COB package 1416 mounted on a top surface 1417 of a PCB substrate 1415, for example, by surface mounting one or more metal pads 1418 on the PCB substrate 1415. The COB package 1416 may be implemented a traditional COB 1420 having one row of metal contact pads 1423 or alternatively, an extended COB 1419 having two rows of electrical contact pads 1421-1422, similar to those configurations described above.

Figure 15B:
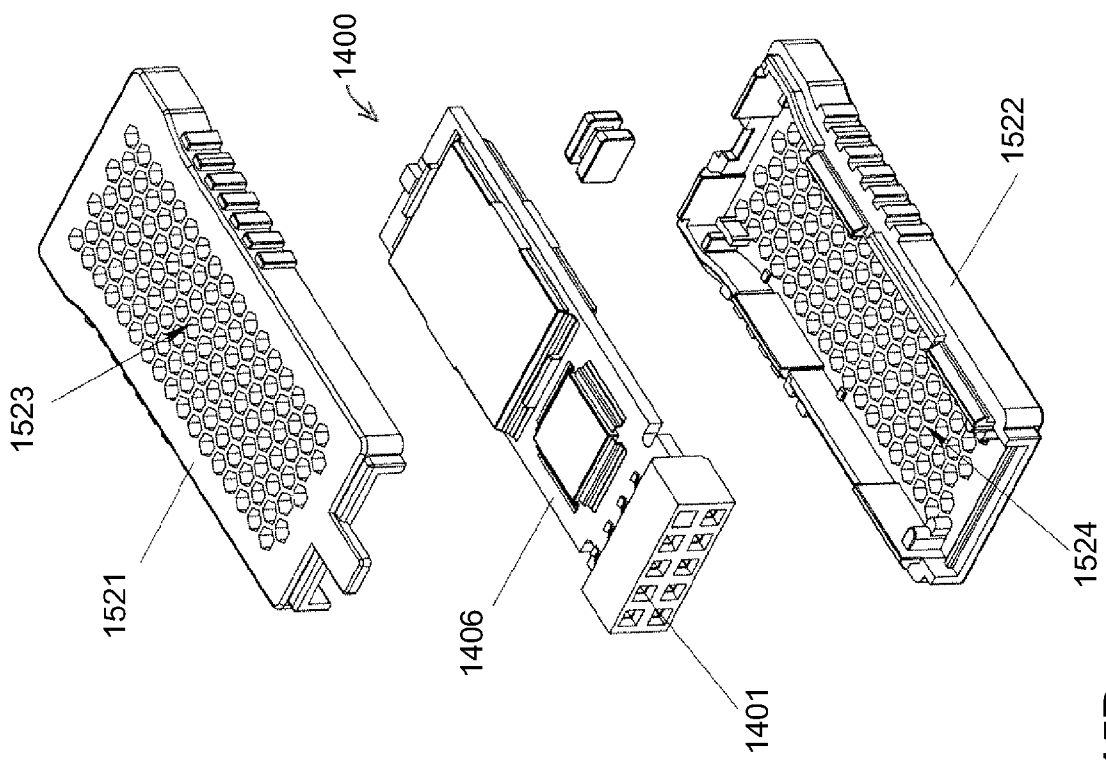

The above USB devices may be assembled in a variety of USB drive form factors. FIGS. 15A-15C are block diagrams illustrating certain configurations of an extended USB drive according to certain embodiments of the invention. Referring to FIG. 15A, the structure of a UBS flash drive 1500 includes a top housing 1501 and a bottom housing 1502 for enclosing a USB device 1400 using a snap-together method or apply ultrasonic press for sealing around edges 1503 of housing. The USB device 1400 may include a PCBA 1406 coupled to an extended USB header vertical receptacle 1401. The USB flash drive 1500 is coupled with a motherboard inside a computer chassis by way of 9-pin header receptacle 1401 and a plug. The housing of device 1500 is designed for the purpose of convenience for removing or attaching USB flash drive off or to the mother board. The top and bottom surfaces of housings are used for marking or labeling company's logo or unit specifications descriptions.

Referring now to FIG. 15B, according to an alternative embodiment, the structure of the UBS flash drive 1520 includes a top housing 1521, a bottom housing 1522, and a PCBA 1400 using snap-together method or apply ultrasonic press for sealing around edges 1525 of the housing. The USB flash drive 1520 is coupled with a motherboard inside computer chassis (not shown) by way of 9-pin header receptacle 1401 and a plug. The housing of device 1520 is designed for the purpose of convenience for removing or attaching USB flash drive 1520 off or to the motherboard. The top and bottom housings 1521-1522 have certain perforations 1523-1524 for a weigh reduction and air flow purpose.

FIG. 15C shows an alternative embodiment of the design similar to the one shown in FIG. 15B. Referring to FIG. 15C, in this embodiment, the extended USB device 1400 is enclosed by a housing having a top housing portion 1551 and a bottom housing portion 1552, forming an extended USB drive 1550, where each housing portion includes an opening or cut-out 1553-1554 for a weigh reduction and air flow purpose.

As described above, an extended USB drive is coupled to a motherboard of a computer chassis via a 9-pin receptacle, where the extended USB driver is position in a vertical orientation with respect to a surface of the motherboard. According to certain embodiments of the invention, the 9-pin receptacle may be designed in a way such that an extended USB driver is positioned in a horizontal orientation (e.g., parallel) with respect to a surface of the motherboard.

Figure 16A:
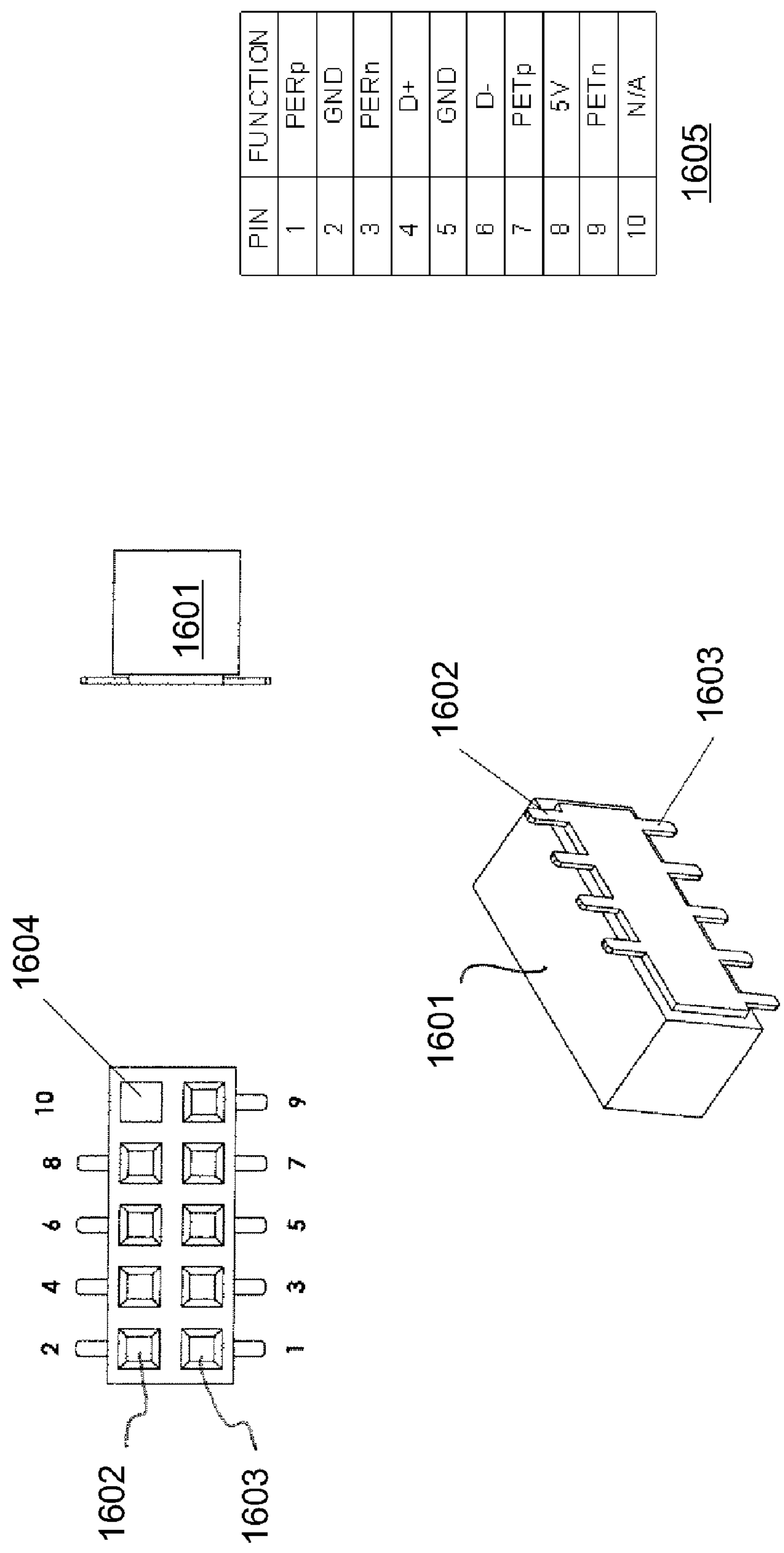
FIGS. 16A-16C are block diagrams illustrating certain configurations of an extended USB device according to certain embodiments of the invention.
Figure 16B:
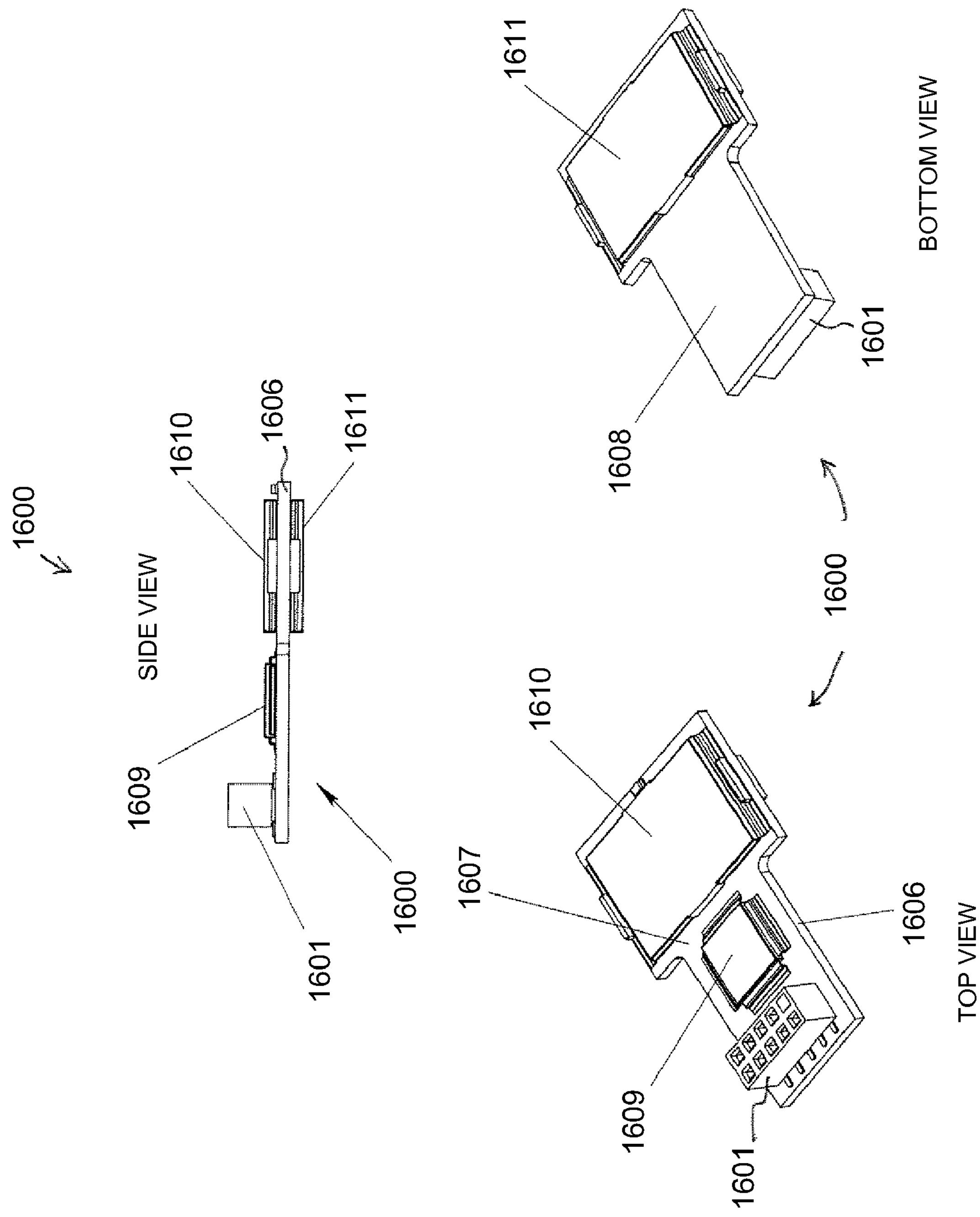
Figure 16C:
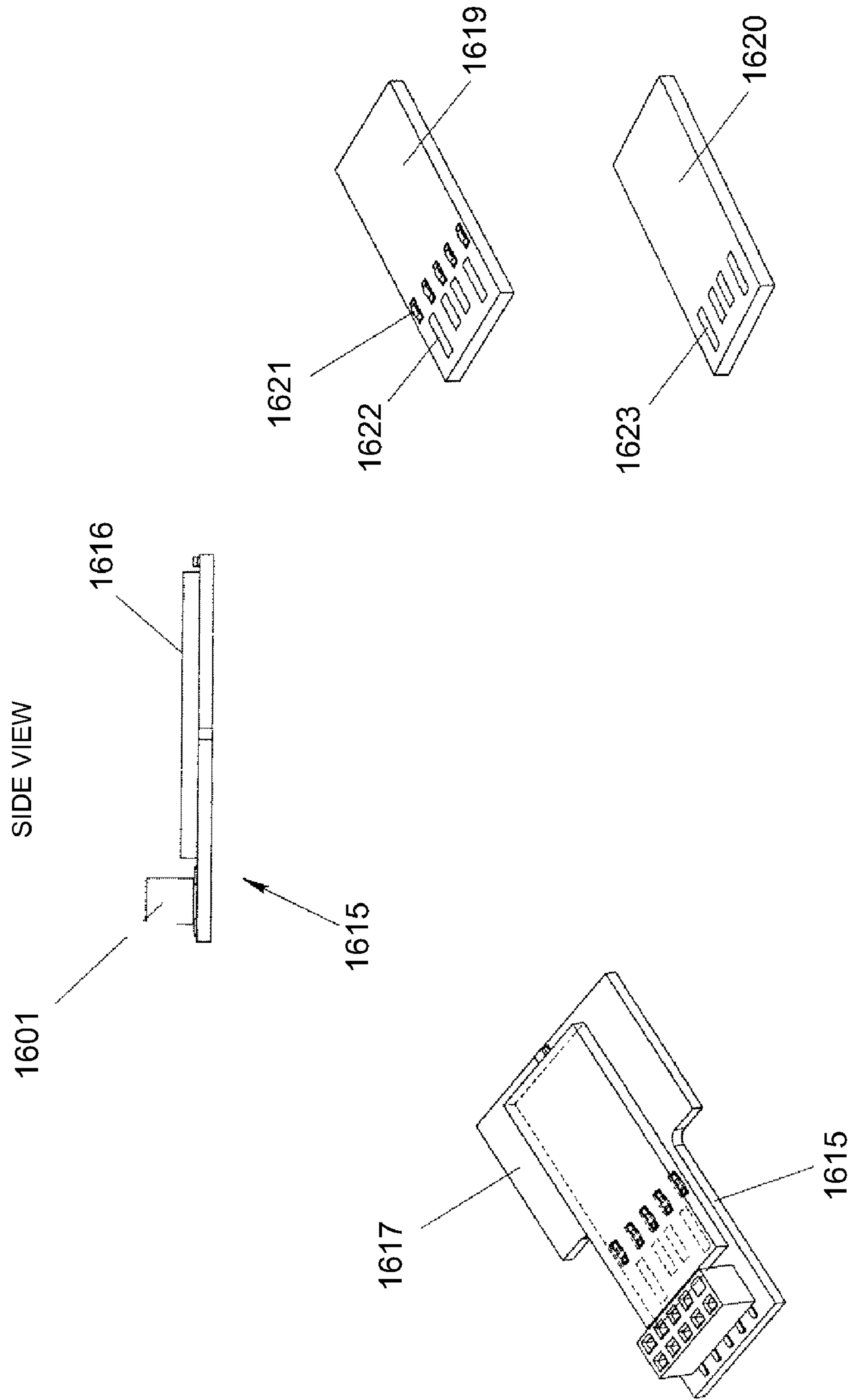

FIGS. 16A-16C are block diagrams illustrating certain configurations of an extended USB device according to certain embodiments of the invention. Referring to FIG. 16A, an embedded USB flash drive or Ready Boost drive is to use with a MLC dual-personality extended USB header vertical receptacle 1601. The USB header vertical receptacle 1601 may include a 9-pin socket that is compatible with an ordinary socket or connector used in an ordinary computer, such as, for example, ATA style connector. In this example as shown in FIG. 16A, USB header vertical receptacle 1601 includes two rows of pins 1602-1603, each having five pins. One of the rows 1602-1603, in this example, row 1602 only includes 4 pins, leaving one of the plugs 1604 unattached. As a result, a total of 9 pins are implemented in this example, where functionality of each pin is shown in table 1605. Receptacle 1601 is designed similar to receptacle 1401 of FIG. 14A, except that pins 1602-1603 are configured as a surface mount pins. Unlike the configuration as shown in FIGS. 14A-14C where the pins 1402-1403 are mounted or soldered on two sides of a PCBA, pins 1602-1603 are surface mounted on one side of the PCBA, for example, as shown in FIG. 16B. As a result, the finished USB driver can be plugged into a socket (e.g., male socket) of the motherboard in parallel with a surface of the motherboard. Note that the USB header vertical receptacle 1601 is shown for illustration purposes only; other forms of receptacles may also be implemented.

According to one embodiment, as shown in FIG. 16B, each of the rows 1602-1603 may be mounted or soldered on corresponding electrical contact pads of a surface of a PCBA, for example, the same surface of the PCBA, where a PCBA may be any of the above configurations. For example, referring to FIG. 16B, USB header vertical receptacle 1601 is surface mounted onto a PCBA 1600 having a MLC controller 1609 and one or more MLC memory ICs 1610-1611, which may be mounted (e.g., surface mounted) on a top surface 1607 and a bottom surface 1608 of PCB 1606. As described above, the USB header vertical receptacle 1601 includes two rows of pins, each being surface mounted on the same surface (e.g., top surface) of PCB 1606. As a result, the orientation of plugs of USB header vertical receptacle 1601 is in a vertical direction with the top and bottom surfaces 1607-1608 of PCBA 1600, which would enable the finished USB package to be mounted on (e.g., via a corresponding connector, in this example, a male connector of) a chassis such as a motherboard of a computer in a horizontal orientation with respect to a surface of the motherboard.

Alternatively, as shown in FIG. 16C, the PCBA may be implemented as a COB package 1616 mounted on a top surface 1617 of a PCB substrate 1615, for example, by surface mounting one or more metal pads on the PCB substrate 1615. The COB package 1616 may be implemented a traditional COB 1620 having one row of metal contact pads 1623 or alternatively, an extended COB 1619 having two rows of electrical contact pads 1621-1622, similar to those configurations described above. Note that USB device as shown in FIGS. 16A-16C may be enclosed by a housing similar to those as shown in FIGS. 15A-15C. Other configurations may exist.

According to certain embodiments of the invention, the techniques described above with respect to FIGS. 4A-4C, 5A-5C, 14A-14C, 15A-15C, and 16A-16C can be used in designing an extended USB portable storage device. FIG. 7 is a block diagram illustrating an example of an extended USB device having an extended USB plug with multiple personalities according to one embodiment of the invention. Referring to FIG. 7, USB package 703 which may include an extended USB plug 701 having multiple interfaces or personalities as described and a PCBA 704 may be enclosed by a housing as an extended USB device 700. Note that package 703 may be an apparatus as described in FIGS. 4A-4B or alternatively, as an apparatus as shown in FIGS. 5A-5C. The housing for housing the package 703 includes a top housing 705 and a bottom housing 706. The top housing 705 and the bottom housing 706 may be attached to each other via a variety of methods, including using a snap together method or applying ultrasonic press for sealing around edges 702 of top housing 705 and bottom housing 706.

Figure 8A:
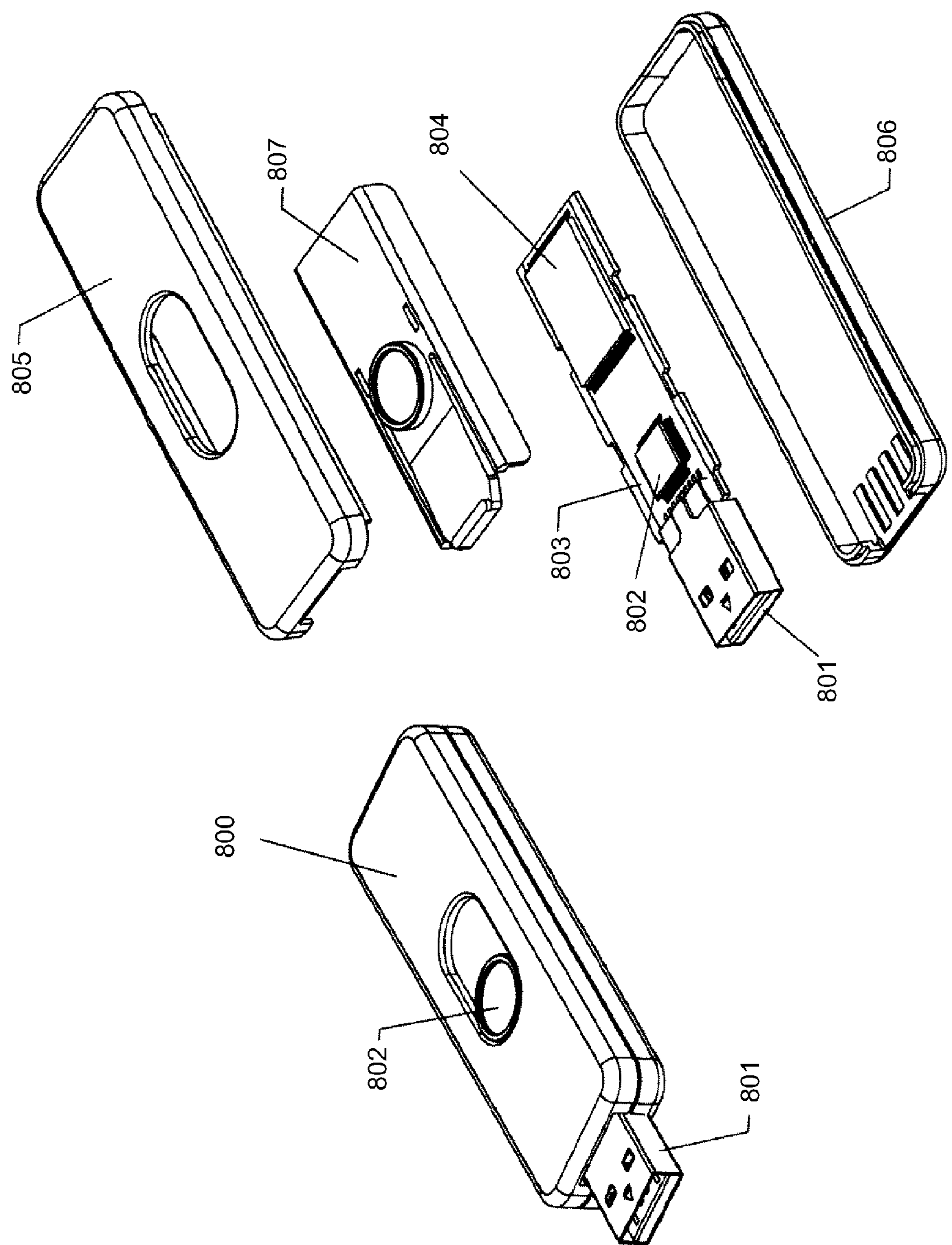
Figure 9:
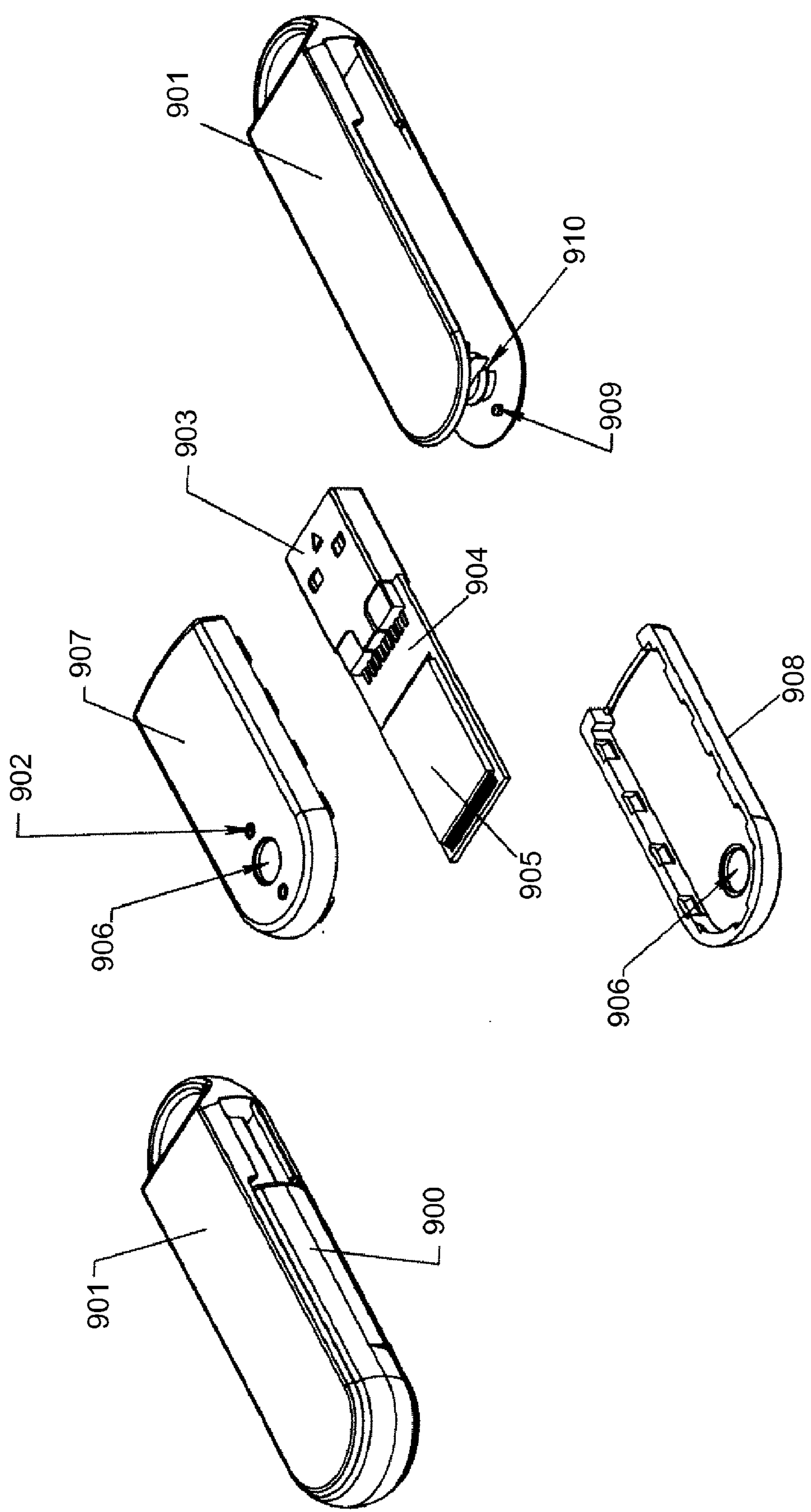
FIG. 9 is a block diagram illustrating an extended USB device according to another embodiment of the invention.

Note that extended USB device 700 as shown in FIG. 7 may be implemented in a variety of configurations, such as, those as shown in FIGS. 8A-8B and 9. FIGS. 8A-8B are block diagrams illustrating examples of USB devices having an extended USB plug with multiple interfaces or personalities. Referring to FIG. 8A, extended USB device 800 includes an extended USB plug 801 as described above and a press/push button 802 that can be used to push and/or pull the extended USB plug 801 as well as the attached herein PCBA 803 having a flash memory controller 812 (e.g., MLC controller) and a memory IC 804 (e.g., MLC memory IC) in and out of a housing of extended USB device 800. The housing includes a top housing 805 and a bottom housing 806 which may be attached together via a snap together method or via ultrasonic sealing. In addition, extended USB device 800 includes a PCB holder 807 to maintain a press/push mechanism to deploy and retract USB plug in and out of the housing.

According to an alternatively embodiment as shown in FIG. 8B, a press/push button may be implemented on a side surface. Referring to FIG. 8B, extended USB device 850 includes an extended USB plug 851 as described above and a press/push button 857 that can be used to push and/or pull the extended USB plug 851 as well as the attached herein PCBA 853 having a flash memory controller 852 (e.g., MLC controller) and a memory IC 854 (e.g., MLC memory IC) in and out of a housing of extended USB device 850. The housing includes a top housing 855 and a bottom housing 856 which may be attached together via a snap together method or via ultrasonic sealing. In addition, extended USB device 800 includes a PCB holder 857 to maintain a press/push mechanism to deploy and retract USB plug in and out of the housing. Further detailed information regarding the press/push mechanism above can be found in a co-pending U.S. patent application Ser. No. 11/845,747, filed Aug. 27, 2007, which has been assigned to a common assignee of the present application and is incorporated by reference herein in its entirety.

FIG. 9 is a block diagram illustrating an example of extended USB device having an extended USB plug with multiple personalities according to one embodiment of the invention. Referring to FIG. 9, extended USB device 900 is a MLC compatible USB flash drive in which a swivel cap 901 is attached to the extended USB device 900 by a pivot pin with at least two locking positions 902.

Referring to FIG. 9, extended USB flash drive 900 includes a dual-personality extended USB plug 903 as described above and a PCBA 904 with MLC flash memory and/or controller IC 905. Specifically, USB flash drive includes an extended USB device 900 and a swivel cap 901 which is attached to the extended USB device 900 by pressing pivot pins 910 (swivel cap) into pivot holes 906 (top/bottom housing). Locking positions of swivel cap related to the USB device are obtained whenever lock pins 909 (swivel cap) snap into lock holes (top/bottom housing). The extended USB device 900 includes a top, bottom housing 907-908 and a PCBA 904 as described above. The assembly of top and bottom housing 907-908 utilizes snap-together method or apply ultrasonic press for sealing around edges of housing 907-908. Other configurations may exist.

Figure 10A:
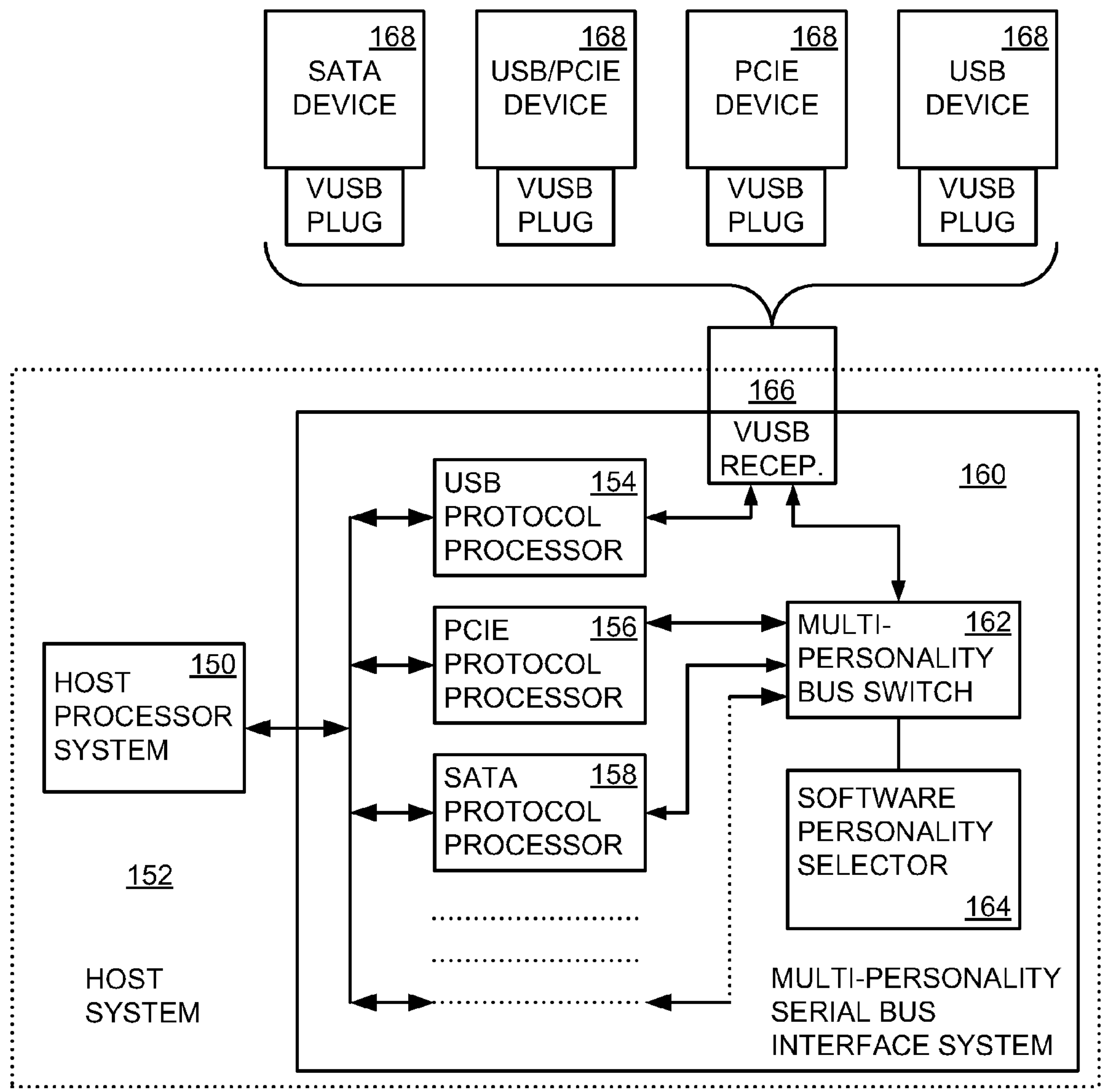
FIG. 10A is a block diagram of a host with an extended-USB socket that supports extended-mode communication according to one embodiment of the invention.

FIG. 10A is a block diagram of an exemplary host with one embodiment of an extended-USB socket that supports extended-mode communication. The configuration as shown in FIG. 10A may be utilized with embodiments of techniques described above. A variety of extended-USB or USB peripherals 168 could be plugged into extended-USB socket 166 of host 152. For example, a SATA peripheral, a PCI-Express peripheral, a Firewire IEEE 1394 peripheral, a Serial-Attached SCSI peripheral, or a USB-only peripheral could be inserted. Each can operate in its own standard mode.

Host 152 has processor system 150 for executing programs including USB-management and bus-scheduling programs. Multi-personality serial-bus interface 160 processes data from processor system 150 using various protocols. USB processor 154 processes data using the USB protocol, and inputs and outputs USB data on the USB differential data lines in extended USB socket 166.

The extended metal contact pins in extended USB socket 166 connect to multi-personality bus switch 162. Transceivers in multi-personality bus switch 162 buffer data to and from the transmit and receive pairs of differential data lines in the extended metal contacts for extended protocols such as PCI-Express, Firewire IEEE 1394, Serial-Attached SCSI, and SATA. When an initialization routine executed by processor system 150 determines that inserted peripheral 168 supports SATA, personality selector 164 configures multi-personality bus switch 162 to connect extended USB socket 166 to SATA processor 158. When the initialization routine executed by processor system 150 determines that inserted peripheral 168 supports PCI-Express, personality selector 164 configures multi-personality bus switch 162 to connect extended USB socket 166 to PCI-Express processor 156. Then processor system 150 communicates with either PCI-Express processor 156 or SATA processor 158 instead of USB processor 154 when extended mode is activated.

Figure 10B:
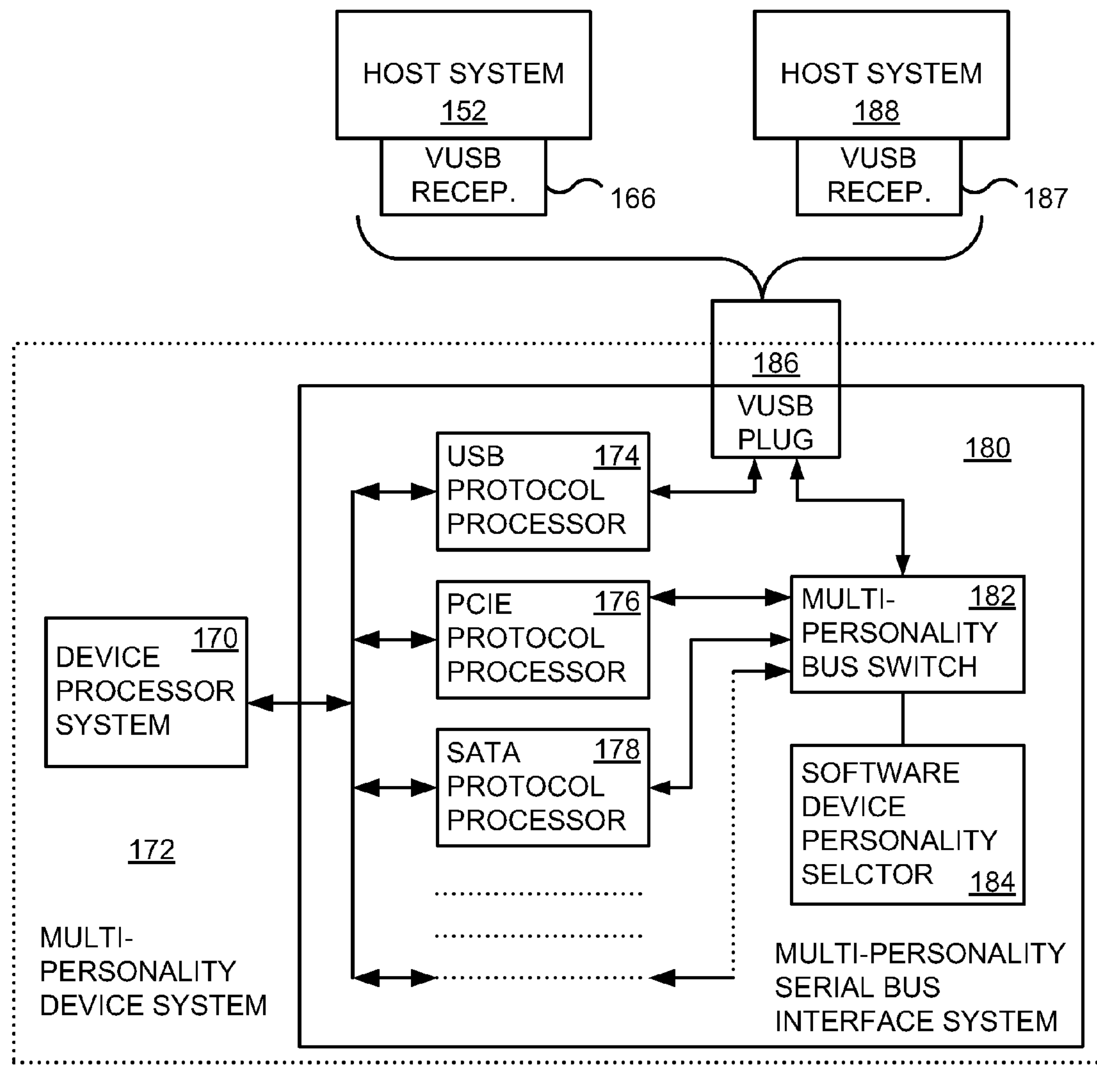
FIG. 10B is a block diagram of a peripheral with an extended-USB connector that supports extended-mode communication according to one embodiment of the invention.

FIG. 10B is a block diagram of an exemplary peripheral with one embodiment of an extended-USB connector that supports extended-mode communication. The configuration as shown in FIG. 10B may be utilized with embodiments of techniques described above. Multi-personality peripheral 172 has extended USB connector 186 that could be plugged into extended-USB socket 166 of host 152 that has extended-mode communication capabilities such as SATA, 1394, SA-SCSI, or PCI-Express. Alternately, extended USB connector 186 of multi-personality peripheral 172 could be plugged into standard-USB socket 187 of host 188 that only supports standard USB communication.

Multi-personality peripheral 172 has processor system 170 for executing control programs including USB-peripheral-control and response programs. Multi-personality serial-bus interface 180 processes data from processor system 170 using various protocols. USB processor 174 processes data using the USB protocol, and inputs and outputs USB data on the USB differential data lines in extended USB connector 186.

The extended metal contact pins in extended USB connector 186 connect to multi-personality bus switch 182. Transceivers in multi-personality bus switch 182 buffer data to and from the transmit and receive pairs of differential data lines in the extended metal contacts for extended protocols such as PCI-Express, 1394, SA SCSI, and SATA. When a control or configuration routine executed by processor system 170 determines that host 152 has configured multi-personality peripheral 172 for SATA, personality selector 184 configures multi-personality bus switch 182 to connect extended USB connector 186 to SATA processor 178. When the initialization routine executed by processor system 170 determines that inserted peripheral 188 supports PCI-Express, personality selector 184 configures multi-personality bus switch 182 to connect extended USB connector 186 to PCI-Express processor 176. Then processor system 170 communicates with either PCI-Express processor 176 or SATA processor 178 instead of USB processor 174 when extended mode is activated.

If a PCI Express device with an extended USB plug is plugged into a host system with a conventional USB receptacle, nothing will be recognized if the PCI Express device does not support USB. The host system will not see anything that has plugged into the system. The same is true for a SATA-only device, etc.

Figure 11:
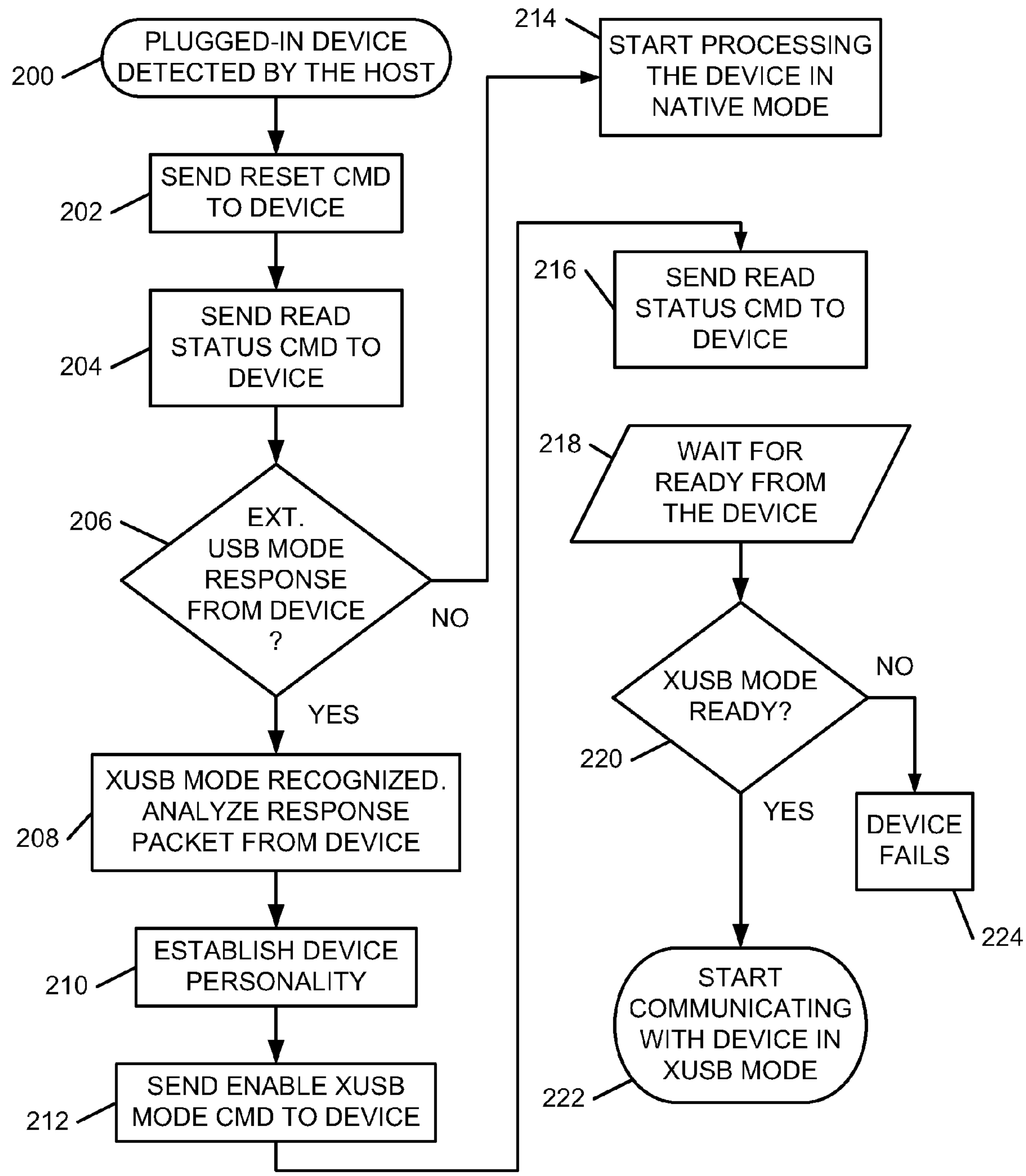
FIG. 11 is a flowchart of an initialization routine executed by a host for detecting a device plugged into an extended USB socket according to one embodiment of the invention.

FIG. 11 is a flowchart of one embodiment of an initialization routine executed by a host for detecting a device plugged into an extended USB socket. A host such as a PC can have an extended USB socket. Either an extended USB device, or a standard USB device can be plugged into the extended USB socket. This routine detects whether the inserted device supports extended-USB mode or only standard USB mode. The routine may be executed by processor system 150 of FIG. 10A.

The host detects a newly-inserted device plugged into the extended USB socket, step 200, such as by detecting resistance changes on the metal contact pins of the extended USB socket. When the newly-inserted device is detected, a USB reset command is sent over the USB differential signal lines to the device, step 202. A USB read-status command is then sent by the host, step 204.

The peripheral device responds by sending its status information using USB protocols. The host examines this status information, and in particular looks for a mode identifier indicating that the peripheral supports extended-USB mode. This mode identifier can be a status bit or a unique code in an area reserved for use by the peripheral vendor to identify the peripheral's type or capabilities.

When the peripheral responds with a status indicating no extended-USB support, step 206, then processing continues in native USB mode, step 214. Standard USB transactions are performed between the host and the peripheral using the differential USB data pins in the four-pin side of the extended USB socket. The peripheral likely has a standard USB connector that has only 4 metal contact pins, not the extension with the 8 additional metal contact pins.

When the peripheral responds with a status indicating extended-USB support, step 206, then the host further examines the packet from the peripheral to determine that the peripheral can support higher-speed communication using the extended metal contact pins, step 208. The peripheral has an extended USB connector with the 8 additional metal contact pins in an extension portion of the connector.

The host can further examine the capabilities of the peripheral, such as to determine which extended modes are supported, step 210. Some peripherals may support PCI-Express communication in extended mode, while others support Serial-ATA, Serial Attached SCSI, or IEEE 1394 as the extended-mode protocol.

The host then sends a vendor-defined USB OUT command to the peripheral, step 212. This command instructs the peripheral to activate its extended mode of operation. The host verifies that the device received the command by reading its status again, step 216. The peripheral responds with a ready status, step 218. If the status read back from the device does not indicate that the peripheral is ready to switch to extended mode, step 220, then the device fails, step 224. The host could fall back on standard USB mode, step 214, or attempt again to activate extended mode, step 202. After trying a predetermined number of times, the host falls back on standard USB mode, step 214.

When the peripheral responds with the correct ready, step 220, then the host and peripheral can begin communicating in the extended mode. The 8 additional metal contact pins in the extended portion of the USB connector and socket are used for communication rather than the 4 USB metal contact pins. For example, the PCI-Express transmit and receive differential pairs can be used to bidirectionally send and receive data when the device has a PCI-Express personality. The host uses these extended pins to send a read-status command to the peripheral, step 222. Data can be sent and received at the higher rates supported by PCI-Express rather than the slower USB rates.

Figure 12:
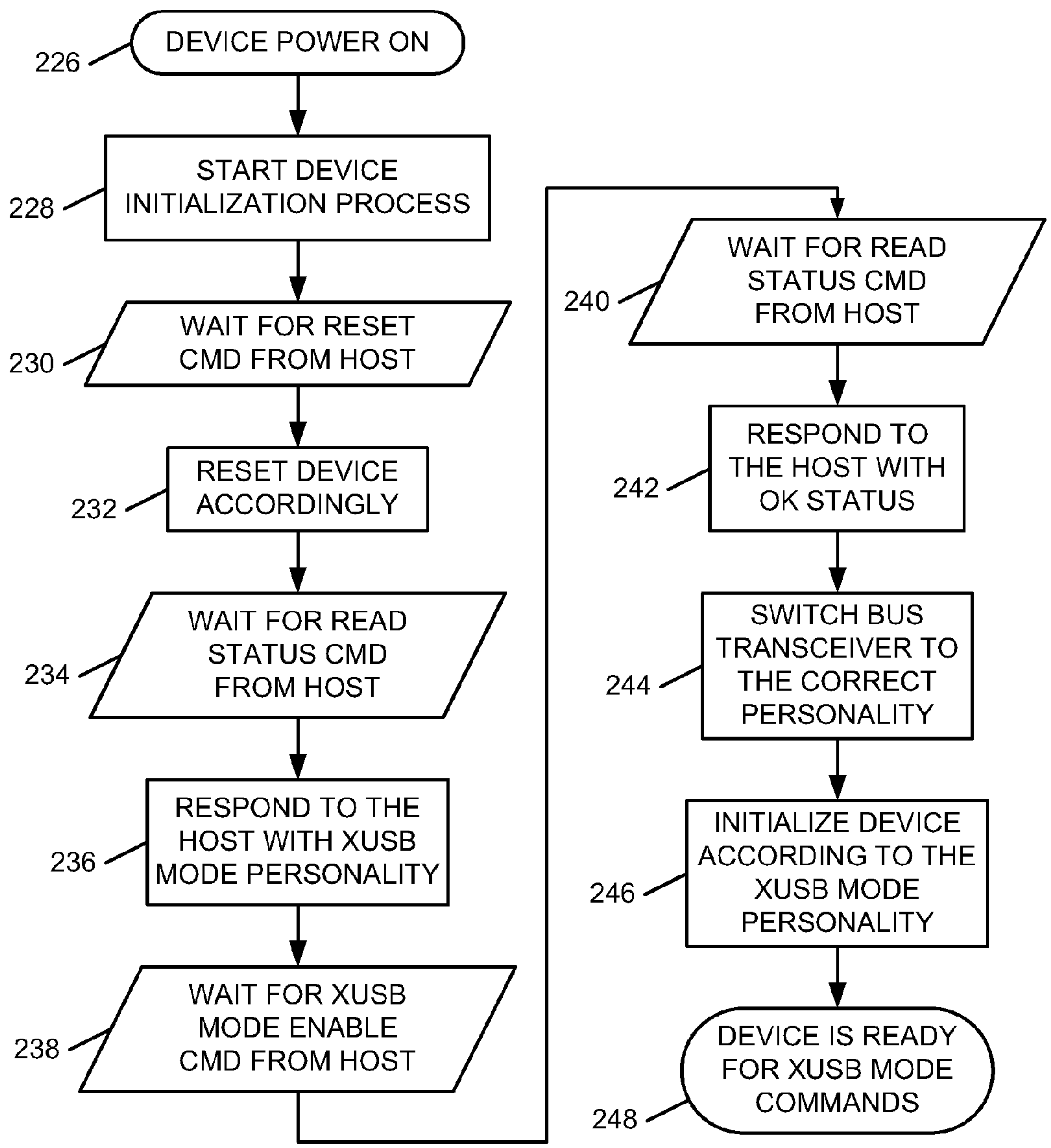
FIG. 12 is a flowchart of an initialization routine executed by a peripheral device plugged into an extended USB socket according to one embodiment of the invention.

FIG. 12 is a flowchart of one embodiment of an initialization routine executed by a peripheral device plugged into an extended USB socket. A peripheral can have an extended USB connector that can be plugged into either an extended USB socket or a standard USB socket. This routine executes on the peripheral device and helps the host detect that the inserted device supports extended-USB mode. The routine may be executed by peripheral-device processor system 170 of FIG. 10B.

When the peripheral device is plugged into the USB socket, power is received though the power and ground pins on the 4-pin USB portion of the connector, step 226. The peripheral device executes any initialization procedures to power itself up, step 228, and waits for a reset command from the host, step 230. Once the reset command is received from the host, the peripheral device resets itself, step 232.

The peripheral device waits for further commands from the host, step 234, such as a read-status command. The status read by the host, or further data read by the host can contain capability information about the peripheral device, such as which extended modes are supported, PCI-Express, SATA, IEEE 1394, SA SCSI, etc., step 236. The reset and read-status commands are standard USB commands from the host.

The peripheral device then waits for a command from the host to enable extended-mode communication, step 238. An enable command followed by another read-status command must be received, so the peripheral waits for the read-status command, step 240. Once the read-status command is received, the peripheral responds with an OK or READY status to indicate that it is ready to switch to using the extended metal contact pins on the connector, step 242.

Then the peripheral device switches its bus transceivers to match the bus-protocol specified by the host to be able to communicate over the 8 extension metal contact pins, step 244. The 4 USB metal contact pins are not used. The peripheral device waits for a read-status command sent by the host over the extended metal contact pins and responds to this read-status command, step 246, initializing for the new protocol mode. The peripheral device can then receive extended commands such as PCI-Express commands that are received over the extended metal contact pins on the extended portion of the connector, such as the PCI-Express transmit and receive differential lines, step 248.

FIG. 13 is a table of extended and standard pins in one embodiment of an extended USB connector and socket. The A side of the pin substrates contains the four standard USB signals, which include a 5-volt power signal and ground. The differential USB data D−, D+ are carried on pins 2 and 3. These pins are not used for extended modes.

Side B of the pin substrates, or the extension of the primary surfaces, carries the extended signals. Pin 1 is a 3.3-volt power signal for modified PCI-Express generation 0 and Serial-ATA (SATA), while pin 2 is a 1.5-volt supply for modified PCI-Express generation 0 and reserved for SATA. For modified PCI-Express generations 1, 2, and 3, pins 1 and 2 carry the transmit differential pair, called PETn, PETp, respectively. Pin 8 is a 12-volt power supply for SATA and reserved for modified PCI-Express generation 0. Pin 8 is a ground for modified PCI-Express generations 2 and 3. Pin 5 is a ground for modified PCI-Express generation 0 and SATA.

Pins 3 and 4 carry the transmit differential pair, PETn, PETp, respectively, for modified PCI-Express generation 0, and T−, T+, respectively, for SATA. Pin 3 is a ground for modified PCI-Express generations 1, 2, and 3. Pin 4 and pin 5 carry receive differential pair, called PERn and PERp, respectively, for modified PCI-Express generations 1, 2, and 3. Pins 6 and 7 carry the receive differential pair, PERn, PERp, respectively, for modified PCI-Express generation 0 and R−, R+, respectively, for SATA. Pins 6 and 7 carry a second transmit differential pair, called PETn1 and PETp1, respectively, for modified PCI-Express generations 2 and 3.

Pins 9 and 10 carry a second receive differential pair, called PERn1 and PERp1, respectively, for modified PCI-Express generations 2 and 3.

Pins 11 and 12 carry a third transmit differential pair, called PETn2 and PETp2, respectively, for modified PCI-Express generation 3. Pin 13 is a ground for modified PCI-Express generation 3. Pins 14 and 15 carry a third receive differential pair, called PERn2 and PERp2, respectively, for modified PCI-Express generation 3.

Pins 16 and 17 carry a fourth transmit differential pair, called PETn3 and PETp3, respectively, for modified PCI-Express generation 3. Pin 18 is a ground for modified PCI-Express generation 3. Pins 19 and 20 carry a fourth receive differential pair, called PERn3 and PERp3, respectively, for modified PCI-Express generation 3.

The ExpressCard pins REFCLK+, REFCLK−, CPPE#, CLKREQ#, PERST#, and WAKE# are not used in the extended USB connector to reduce the pin count. Additional pins may be added to the extended USB connector and socket if some or all of these pins are desired. Furthermore, the pin names and signal arrangement (or order) illustrated in FIG. 10 is merely one embodiment. It should be apparent that other pin names and signal arrangement (or order) may be adopted in other embodiments.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An extended universal serial bus (USB) storage device, comprising:

a printed circuit board assembly (PCBA) having a flash memory device and a flash controller mounted thereon, the PCBA having a plurality of plug standard metal contact pads compatible with a standard USB connector plug and the PCBA having a plurality of plug extended metal contact pads compatible with an extended USB connector plug, wherein the plurality of plug standard metal contact pads are disposed as a first row of metal contact pads along a first edge on a first surface of the PCBA, wherein the plurality of plug extended metal contact pads are disposed as a second row of metal contact pads in parallel of the first row along the first edge on the same surface of the PCBA, wherein the plurality of plug standard metal contact pads and plug extended metal contact pads include a first pair having a first pad and a second pad corresponding to a first differential serial bus for transmitting signals, the first pad being associated with a positive polarity of the signals being transmitted and the second pad being associated with a negative polarity of the signals being transmitted, and wherein the plurality of plug standard metal contact pads and plug extended metal contact pads further include a second pair having a third pad and a fourth pad corresponding to a second differential serial bus for receiving signals, the third pad being associated with a positive polarity of the signals being received and the fourth pad being associated with a negative polarity of the signals being received; and a header receptacle coupled to the PCBA for providing a USB compatible interface to the flash memory device and the flash controller, the header receptacle having a first end and a second end, wherein the first end of the header receptacle includes a first set of pins coupled to the plurality of plug standard metal contact pads of the PCBA and a second set of pins coupled to the plurality of plug extended metal pads of the PCBA respectively, wherein the first set of pins are disposed as a first row of pins and the second set of pins are disposed as a second row of pins parallel to the first row of pins, wherein the plurality of pins of the first end is disposed on a first surface of the PCBA, wherein the flash controller is disposed on the first surface of the PCBA, and wherein the flash memory device is disposed on a second surface of the PCBA, wherein the first row of pins are surface mounted onto the first row of metal contact pads on the first surface of the PCBA and the second row of pins are surface mounted onto the second row of metal contact pads on the second surface of the PCBA along the first edge of the PCBA, such that the first row of pins and the second row of pins of the header sandwich the first edge of the PCBA, wherein the second end of the header receptacle includes a plurality of plugs formed in two rows in parallel, each corresponding to and extended from a respective one of the first and second sets of pins, and wherein the second end of the header receptacle can be inserted into and/or removed from a socket disposed on a motherboard of a computer, wherein the second end of the header includes two rows of pin receiving openings with only four pins in one of the rows; and a housing having a top portion and a bottom portion, wherein the top portion and the bottom portion of the housing are attached to each other to enclose the PCBA having the flash controller and flash memory disposed thereon, leaving the header receptacle exposed outside of the housing to be inserted/removed into/from the socket of the motherboard of the computer, wherein the flash memory device and the flash controller are integrated into a chip-on-board (COB) package.

2. The device of claim 1, wherein when the header receptacle attached with the PCBA is inserted into the socket disposed on the motherboard of the computer, a surface of the PCBA is in a parallel orientation with respect to a surface of the motherboard of the computer.

3. The device of claim 2, wherein the first set of pins of the first end of the header receptacle comprises 4 pins and the second set of pins of the first end of the header receptacle comprises 5 pins.

4. The device of claim 3, wherein the plugs of the second end of the header receptacle comprises 9 plugs disposed in two rows, each corresponding to one of the first and second sets of pins of the first end.

5. The device of claim 1, wherein at least one of the top and bottom portions of the housing comprises an opening cut out for weight reduction and/or air flow.

6. The device of claim 5, wherein at least one of the top and bottom portions of the housing comprises a plurality of perforations for the weight reduction and/or air flow.

* * * * *